US 11,537,249 B2

(12) United States Patent
Hatano

(10) Patent No.: US 11,537,249 B2
(45) Date of Patent: Dec. 27, 2022

(54) TOUCH DETECTION DEVICE, METHOD, AND DISPLAY THAT FLATTEN NOISE ON BLOCK REGIONS FORMED BY COMMON ELECTRODES

(71) Applicant: Panasonic Intellectual Property Management Co., Ltd., Osaka (JP)

(72) Inventor: Takashi Hatano, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/375,636

(22) Filed: Jul. 14, 2021

(65) Prior Publication Data
US 2021/0342033 A1 Nov. 4, 2021

Related U.S. Application Data

(63) Continuation of application No. PCT/JP2020/003878, filed on Feb. 3, 2020.

(30) Foreign Application Priority Data

Mar. 14, 2019 (JP) .............................. JP2019-047425

(51) Int. Cl.
*G06F 3/044* (2006.01)
*G02F 1/1333* (2006.01)
(Continued)

(52) U.S. Cl.
CPC .......... *G06F 3/0445* (2019.05); *G02F 1/1368* (2013.01); *G02F 1/13338* (2013.01);
(Continued)

(58) Field of Classification Search
CPC ... G06F 3/0445; G06F 3/0412; G06F 3/04166
See application file for complete search history.

(56) References Cited

U.S. PATENT DOCUMENTS 9,285,910 B2   3/2016  Kim et al.
2011/0187677 A1*  8/2011  Hotelling .............. G06F 3/0443
                                                        345/174
(Continued)

FOREIGN PATENT DOCUMENTS

JP    2014-130350    7/2014
JP    2015-194987   11/2015
WO    2018/123813    7/2018

OTHER PUBLICATIONS

International Search Report (ISR) from International Searching Authority (Japan Patent Office) in International Pat. Appl. No. PCT/JP2020/003878, dated Apr. 14, 2020, along with an English language translation.

*Primary Examiner* — Liliana Cerullo
(74) *Attorney, Agent, or Firm* — Greenblum & Bernstein, P.L.C.

(57) ABSTRACT

A detection value acquirer acquires a plurality of detection values that are based on capacitance of each of a plurality of common electrodes arranged in a matrix. A detection value calculator calculates detection values in a plurality of block regions each containing two or more common electrodes out of the plurality of common electrodes based on the plurality of detection values. A touch detector detects a touch by a conductor on the display screen of a display device based on the detection value of each of the plurality of block regions. The detection value calculator calculates the detection value of each of the plurality of block regions in the display screen based on the detection value of each of the two or more common electrodes included in each of the plurality of block regions.

13 Claims, 29 Drawing Sheets

(51) Int. Cl.
*G02F 1/1368* (2006.01)
*G06F 3/041* (2006.01)

(52) U.S. Cl.
CPC .......... *G06F 3/0412* (2013.01); *G06F 3/0416* (2013.01); *G06F 3/04166* (2019.05); *G02F 2201/121* (2013.01)

(56) References Cited

U.S. PATENT DOCUMENTS

| 2014/0184543 | A1  | 7/2014  | Kim et al. |
| 2015/0277607 | A1  | 10/2015 | Kosugi et al. |
| 2018/0113559 | A1* | 4/2018  | Bae ........................ G06F 3/0412 |
| 2019/0056817 | A1* | 2/2019  | Stevenson .......... G01R 27/2605 |
| 2020/0210022 | A1* | 7/2020  | Kim ................... G06F 3/04184 |

* cited by examiner

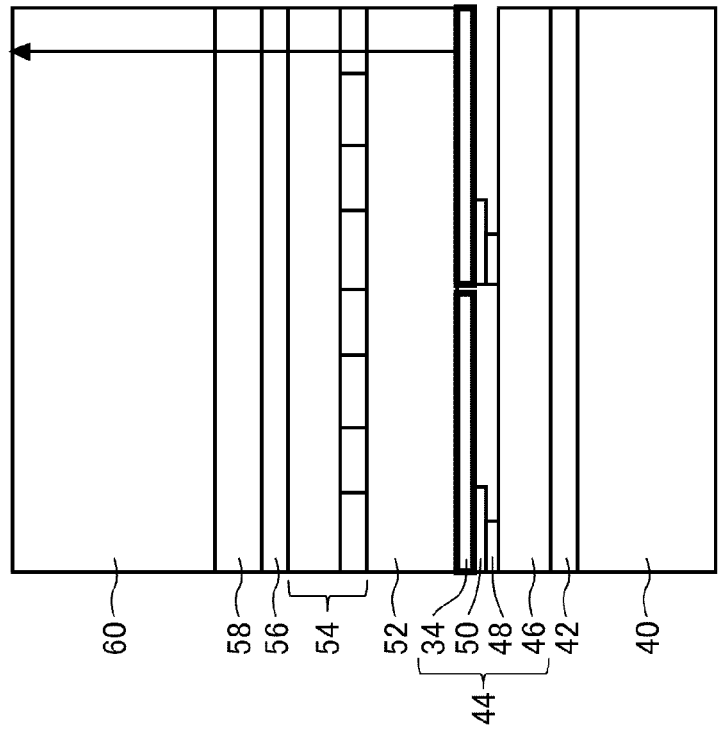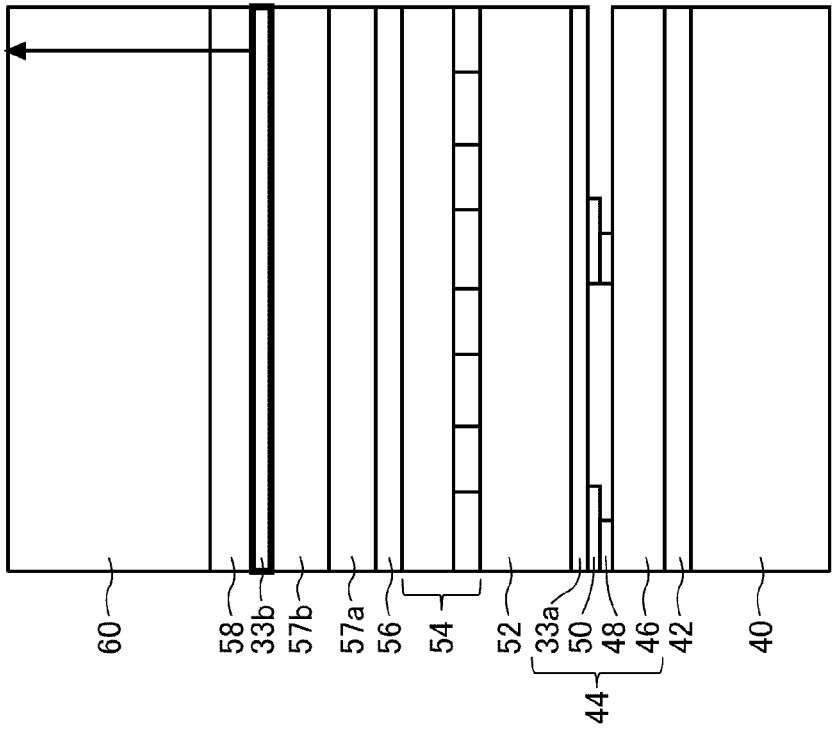

FIG. 6A

| | | | | | | Tn | | | |
|---|---|---|---|---|---|---|---|---|---|
| Ra0 → | 0 | -2 | -10 | -4 | -2 | 0 | -2 | -4 | 4 | -4 |
| | -4 | -2 | 2 | -4 | 5 | -3 | 0 | 0 | 7 | 0 |
| Ra9 → | -14 | -8 | 2 | 0 | -10 | 20 | 0 | -2 | 2 | 2 |
| | -4 | -2 | 0 | 10 | 2 | 6 | -2 | 0 | -4 | -4 |
| | -2 | -6 | -8 | -6 | 0 | -4 | -2 | 4 | -2 | 3 |
| | 7 | 3 | -6 | 3 | 0 | 4 | 1 | 2 | 6 | -7 |
| | -4 | -2 | 1 | -1 | 2 | -7 | 10 | 20 | 12 | 1 |
| | -3 | 2 | 0 | -5 | 0 | -2 | 13 | 35 | 21 | 3 |
| | -2 | 0 | -3 | -2 | 2 | 4 | 11 | 27 | 16 | 1 |
| | -1 | 3 | -4 | -2 | 5 | -3 | 4 | 0 | 5 | 2 |

(Ts labels the circled region in the lower right)

FIG. 6B

| | | | | | Tn | | | |
|---|---|---|---|---|---|---|---|---|
| Ra0 → | -8 | -12 | -16 | -5 | 0 | -5 | -6 | 7 | 7 |
| Ra9 → | -28 | -6 | 0 | -9 | 12 | 17 | -2 | 7 | 11 |
| | -28 | -8 | 12 | 2 | 18 | 24 | -4 | -4 | -4 |
| | -14 | -16 | -4 | 6 | 4 | -2 | 0 | -2 | -7 |
| | 2 | -17 | -17 | -3 | 0 | -1 | 5 | 10 | 0 |
| | 4 | -4 | -3 | 4 | -1 | 8 | 33 | 40 | 12 |
| | -7 | 1 | -5 | -4 | -7 | 14 | 78 | 88 | 37 |
| | -3 | -1 | -10 | -5 | 4 | 26 | 86 | 99 | 41 |
| | 0 | -4 | -11 | 3 | 8 | 16 | 42 | 48 | 24 |

(Ts labels the circled region in the lower right)

FIG. 7A

|    |    |     |    |     |    |    |    |    |    |
|----|----|-----|----|-----|----|----|----|----|----|
| 0  | -2 | -10 | -4 | -2  | 0  | -2 | -4 | 4  | -4 |
| -4 | -2 | 2   | -4 | 5   | -3 | 0  | 0  | 7  | 0  |
| -14| -8 | 2   | 0  | -10 | 20 | 0  | -2 | 2  | 2  |
| -4 | -2 | 0   | 10 | 2   | 6  | -2 | 0  | -4 | -4 |
| -2 | -6 | -8  | -6 | 0   | -4 | -2 | 4  | -2 | 3  |
| 7  | 3  | -6  | 3  | 0   | 4  | 1  | 2  | 6  | -7 |
| -4 | -2 | 1   | -1 | 2   | -7 | 10 | 20 | 12 | 1  |
| -3 | 2  | 0   | -5 | 0   | -2 | 13 | 35 | 21 | 3  |
| -2 | 0  | -3  | -2 | 2   | 4  | 11 | 27 | 16 | 1  |
| -1 | 3  | -4  | -2 | 5   | -3 | 4  | 0  | 5  | 2  |

|     |     |     |     |    |     |     |     |
|-----|-----|-----|-----|----|-----|-----|-----|
| -36 | -26 | -21 | 2   | 8  | 9   | 5   | 5   |
| -30 | -2  | 7   | 26  | 18 | 19  | 1   | 1   |
| -42 | -18 | -10 | 18  | 10 | 20  | -6  | -1  |
| -18 | -12 | -5  | 15  | 5  | 9   | 3   | -2  |
| -17 | -22 | -15 | -9  | 4  | 28  | 51  | 39  |
| -2  | -5  | -6  | -6  | 21 | 76  | 120 | 93  |
| -11 | -10 | -6  | -9  | 33 | 111 | 165 | 136 |
| -8  | -11 | -9  | -3  | 34 | 89  | 132 | 110 |

| 0 | -2 | -10 | -4 | -2 | 0 | -2 | -4 | 4 | -4 |
|---|---|---|---|---|---|---|---|---|---|
| -4 | -2 | 2 | -4 | 5 | -3 | 0 | 0 | 7 | 0 |
| -14 | -8 | 2 | 0 | -10 | 20 | 0 | -2 | 2 | 2 |
| -4 | -2 | 0 | 10 | 2 | 6 | -2 | 0 | -4 | -4 |
| -2 | -6 | -8 | -6 | 0 | -4 | -2 | 4 | -2 | 3 |
| 7 | 3 | -6 | 3 | 0 | 4 | 1 | 2 | 6 | -7 |
| -4 | -2 | 1 | -1 | 2 | 7 | 20 | 10 | -1 | 1 |
| -3 | 2 | 0 | -5 | 0 | 28 | 160 | 35 | 5 | 3 |
| -2 | 0 | -3 | -2 | 2 | 4 | 27 | 11 | 10 | -1 |
| -1 | 3 | -4 | -2 | 5 | -3 | 4 | 0 | -5 | 2 |

| -36 | -26 | -21 | 2 | 8 | 9 | 5 | 5 |
|---|---|---|---|---|---|---|---|
| -30 | -2 | 7 | 26 | 18 | 19 | 1 | 1 |
| -42 | -18 | -10 | 18 | 10 | 20 | -6 | -1 |
| -18 | -12 | -5 | 15 | 5 | 9 | 3 | -2 |
| -17 | -22 | -15 | 5 | 28 | 42 | 38 | 16 |
| -2 | -5 | -6 | 38 | 222 | 267 | 238 | 54 |
| -11 | -10 | -6 | 35 | 250 | 302 | 277 | 73 |
| -8 | -11 | -9 | 27 | 227 | 266 | 247 | 60 |

| -8 | -12 | -16 | -5 | 0 | -5 | -6 | 7 | 7 |
|---|---|---|---|---|---|---|---|---|
| -28 | -6 | 0 | -9 | 12 | 17 | -2 | 7 | 11 |
| -28 | -8 | 12 | 2 | 18 | 24 | -4 | -4 | -4 |
| -14 | -16 | -4 | 6 | 4 | -2 | 0 | -2 | -7 |
| 2 | -17 | -17 | -3 | 0 | -1 | 5 | 10 | 0 |
| 4 | -4 | -3 | 4 | 13 | 32 | 33 | 17 | -1 |
| -7 | 1 | -5 | -4 | 37 | 215 | 225 | 49 | 8 |
| -3 | -1 | -10 | -5 | 34 | 219 | 233 | 61 | 17 |
| 0 | -4 | -11 | 3 | 8 | 32 | 42 | 16 | 6 |

Ra68 Ra69 Rp

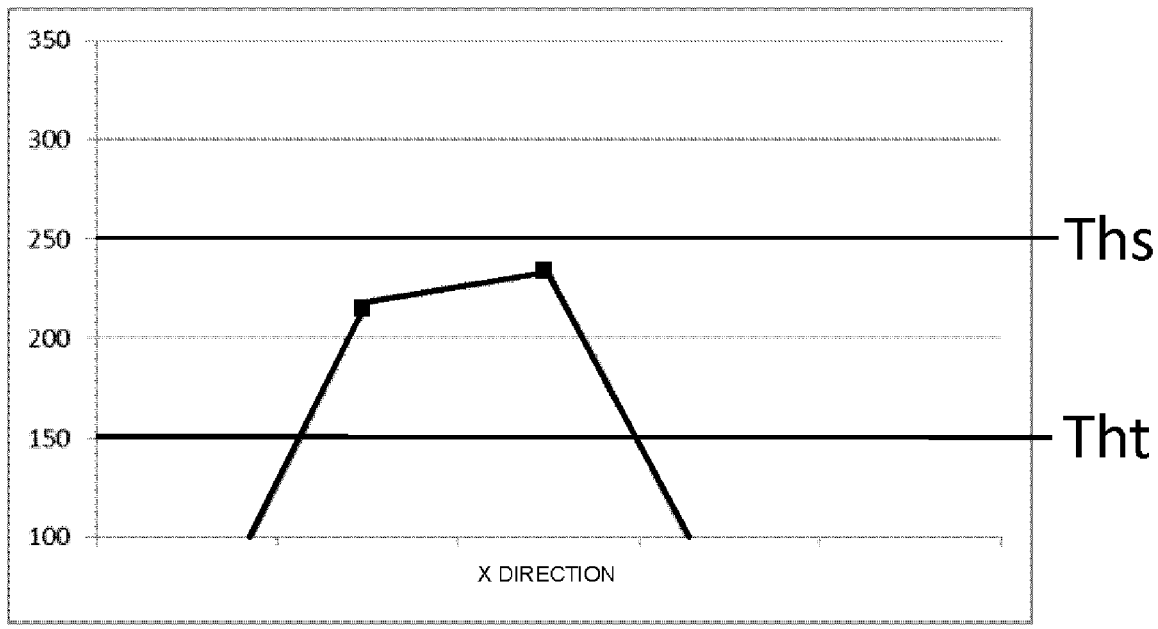

FIG. 18A

|  | 0 | 10 | 2 | 6 | −2 | 0 |
|---|---|---|---|---|---|---|
| Ra0 | −8 | −6 | 0 | −4 | −2 | 4 |
|  | −6 | 3 | 0 | 4 | 1 | 2 |
|  | 1 | −1 | 2 | 7 | 20 | 10 |
| Rb2 | 0 | −5 | 0 | 28 | 160 | 35 |
|  | −3 | −2 | 2 | 4 | 27 | 11 |

FIG. 18B

| Ra0 | −4 | 4 | 0 |
|---|---|---|---|
|  | −3 | 13 | 33 |
|  | −10 | 34 | 233 |

FIG. 18C

|  | −5 | 9 |
|---|---|---|
| Rb2 | −6 | 302 |

FIG. 19A

|  | Ra0 | Ra1 |  |  |  |
|---|---|---|---|---|---|
|  | 0 | 10 | 2 | 6 | -2 | 0 |
|  | -8 | -6 | 0 | -4 | -2 | 4 |
|  | -6 | 3 | 0 | 4 | 1 | 2 |
| Rb25 | 1 | -1 | 2 | 7 | 20 | 10 |
|  | 0 | -5 | 0 | 28 | 160 | 35 |
|  | -3 | -2 | 2 | 4 | 27 | 11 |

| Ra0 | Ra1 |  |  |  |  |
|---|---|---|---|---|---|
| -4 | 6 | 4 | -2 | 0 | -2 |
| -17 | -3 | 0 | -1 | 5 | 10 |
| -3 | 4 | 13 | 32 | 33 | 17 |
| -5 | -4 | 37 | 215 | 225 | 49 |
| -10 | -5 | 34 | 219 | 233 | 61 |
| -11 | 3 | 8 | 32 | 42 | 16 |

FIG. 19C

| -18 | -10 | 18 | 10 | 20 | -6 |
|---|---|---|---|---|---|
| -12 | -5 | 15 | 5 | 9 | 3 |
| -22 | -15 | 5 | 28 | 42 | 38 |
| -5 | -6 | 38 | 222 | 267 | 238 |
| -10 | -6 | 35 | 250 | 302 | 277 |
| -11 | -9 | 27 | 227 | 266 | 247 |

Rb25  Rb26

TOUCH DETECTION DEVICE, METHOD, AND DISPLAY THAT FLATTEN NOISE ON BLOCK REGIONS FORMED BY COMMON ELECTRODES

BACKGROUND

1. Field

The present disclosure relates to a touch detection device of a display device provided with a plurality of common electrodes used for image display and touch detection, to a touch detection method of the display device, to and a display system.

2. Description of the Related Art

An in-cell display device, in which a touch sensor for detecting a user's touch position is built into a display panel, is known (see Patent Literature 1, for example). In such a display device, a common electrode used to supply a common voltage to each pixel of a liquid crystal display panel is divided into multiple common electrodes, which are also used as touch sensor electrodes. During an image display period, a common voltage is supplied to each of the multiple common electrodes, and, during a touch detection period, a touch drive signal for touch detection is supplied to each of the multiple common electrodes.
[Patent Literature 1] WO 2018/123813

SUMMARY

For in-cell display devices, further improvement has been required.

To solve the problem above, a touch detection device according to one aspect of the present disclosure is a touch detection device of a display device including a plurality of common electrodes arranged in a matrix and used for image display and touch detection, including: a detection value acquirer that acquires a plurality of detection values that are based on capacitance of each of the plurality of common electrodes; a detection value calculator that calculates detection values in a plurality of block regions each containing two or more common electrodes out of the plurality of common electrodes based on the plurality of detection values acquired by the detection value acquirer; and a touch detector that detects a touch by a conductor on a display screen of the display device based on the detection value of each of the plurality of block regions calculated by the detection value calculator. The plurality of block regions include at least a first block region and a second block region. The first block region includes at least a first common electrode out of the plurality of common electrodes and a second common electrode adjacent to the first common electrode out of the plurality of common electrodes, and the second block region includes at least the second common electrode and a third common electrode adjacent to the second common electrode out of the plurality of common electrodes and different from the first common electrode. The detection value calculator calculates the detection value of each of the plurality of block regions in the display screen based on the detection value of each of the two or more common electrodes included in each of the plurality of block regions.

Optional combinations of the aforementioned constituting elements, and implementations of the disclosure in the form of methods, apparatuses, systems, or the like may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A shows the longitudinal sectional view of the out-cell display device, and FIG. 5B shows the longitudinal sectional view of the in-cell display device;

FIG. 6A is a diagram showing an example of delta values detected in a plurality of cells arranged in a matrix in the display device, and FIG. 6B is a diagram in which 2×2=4 cells are grouped into one block region and four delta values included in each block region are summed up so as to calculate the delta value of each block region and in which delta values for 9×9=81 block regions are arranged in a matrix;

FIG. 7A is a diagram showing an example of delta values detected in a plurality of cells arranged in a matrix in the display device, and FIG. 7B is a diagram in which 2×2=9 cells are grouped into one block region and nine delta values included in each block region are summed up so as to calculate the delta value of each block region and in which delta values for 9×9=64 block regions are arranged in a matrix;

FIG. 15A shows raw delta values detected in a plurality of cells included in the screen, FIG. 15B shows the delta values of a plurality of block regions generated by grouping of nine cells, and FIG. 15C shows the delta values of a plurality of block regions generated by grouping of four cells;

FIG. 16C is a diagram showing delta values in the second row from the bottom of FIG. 15C in a graph in the X direction;

FIG. 18A shows raw delta values detected in a plurality of cells included in the screen, FIG. 18B shows the delta values of a plurality of block regions generated by grouping of four cells, and FIG. 18C shows the delta values of a plurality of block regions generated by grouping of nine cells;

FIG. 19A shows raw delta values detected in a plurality of cells included in the screen, FIG. 19B shows the delta values of a plurality of block regions generated by grouping of four cells, and FIG. 19C shows the delta values of a plurality of block regions generated by grouping of nine cells;

DETAILED DESCRIPTION

Figure 1:
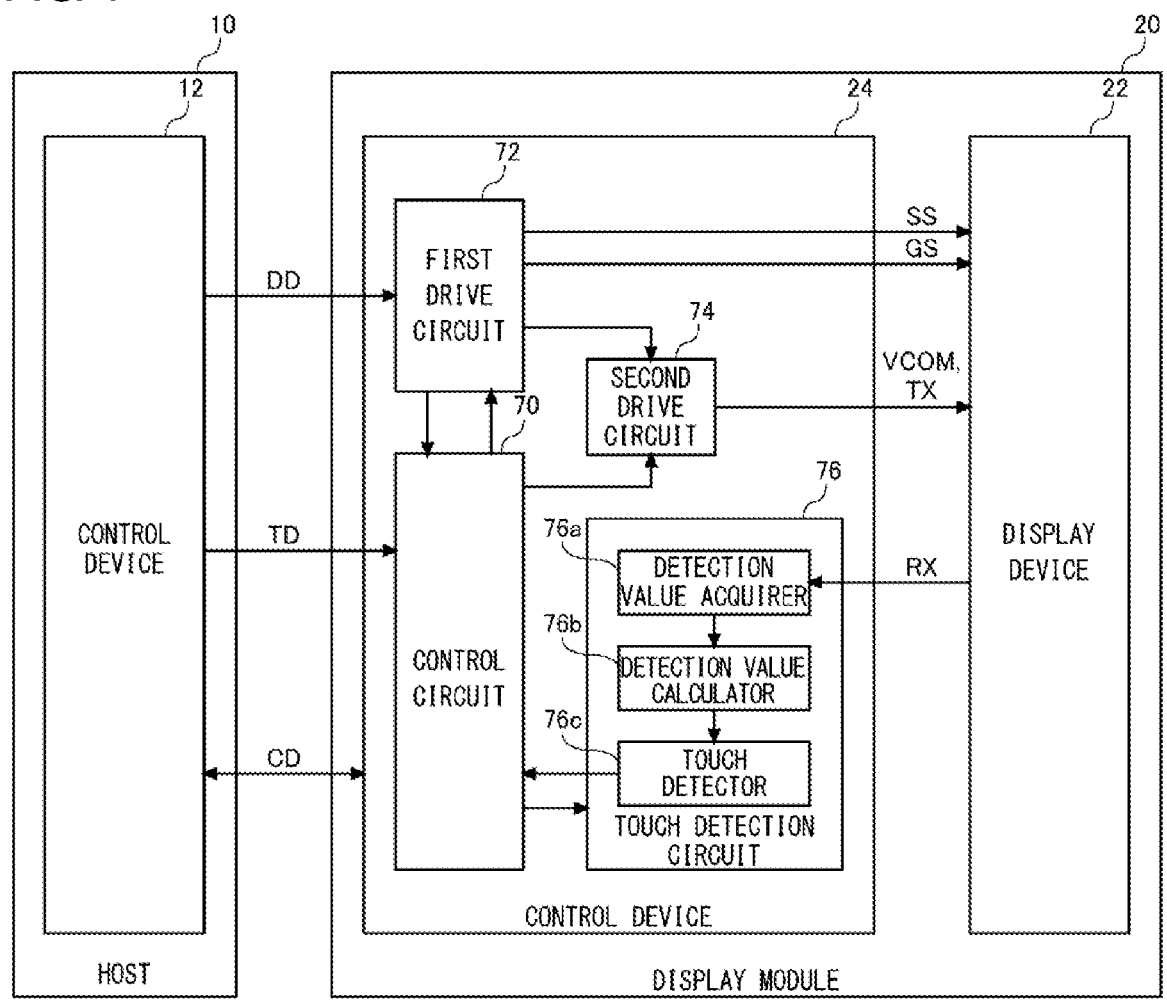
FIG. 1 is a block diagram of a display system according to a first embodiment.

The invention will now be described by reference to the preferred embodiments. This does not intend to limit the scope of the present invention, but to exemplify the invention.

Base Findings of Present Disclosure

Before specific description of embodiments is given, the base findings will be described. The present inventor focuses on the fact that since an in-cell touch-type display device detects touch through common electrodes inside a display panel, the distance from a touch surface to the common electrodes used as touch sensor electrodes becomes long compared to an out-cell touch-type display device in which touch sensor electrodes are arranged outside a display panel. In view of the above, the present inventor has discovered a problem that the touch detection sensitivity needs to be further improved in an in-cell touch-type display device. To solve the problem, a display system according to the present disclosure is configured as described below.

Like reference characters denote like or corresponding constituting elements, members, and processes in each drawing, and repetitive description will be omitted as appropriate. Also, the dimensions of a member may be appropriately enlarged or reduced in each drawing in order to facilitate understanding.

First Embodiment

FIG. 1 is a block diagram of a display system 1 according to the first embodiment. Although an example will be described in which the display system 1 is a vehicle-mounted display system 1 mounted on a vehicle, such as an automobile, the application is not particularly limited, and the display system 1 may also be used for a mobile device.

The display system 1 includes a host 10 and a display module 20. The host 10 performs various functions, such as radio, car navigation, and Bluetooth (registered trademark) communication, and controls the display module 20. The host 10 includes a control device 12.

The control device 12 may be a CPU, for example, and also called a host CPU. The control device 12 supplies image data DD and control data CD to the display module 20 and controls the display module 20 based on such data.

The display module 20 includes a display device 22 and a control device 24. The display device 22 may be used as a center display on which a car navigation screen or the like is displayed within a vehicle cabin, for example.

The display device 22 is an in-cell liquid crystal display device of an in plane switching (IPS) type and is capable of detecting a touch position. The configuration of the display device 22 may be a well-known configuration as described below, for example.

Figure 2:
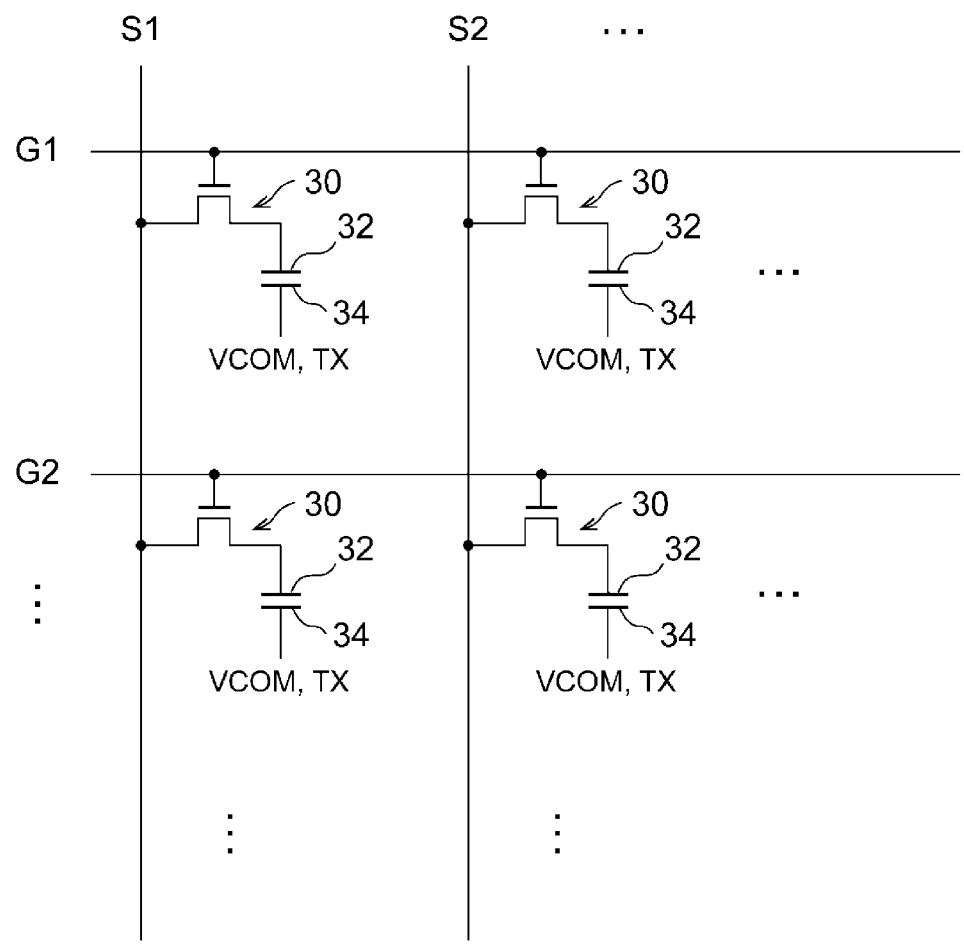
FIG. 2 is a diagram that schematically shows a circuit configuration of a display device shown in FIG. 1.

FIG. 2 schematically shows a circuit configuration of the display device 22 shown in FIG. 1. FIG. 2 also shows schematic arrangement of constituting elements. The display device 22 includes multiple gate lines G1, G2, and so on extending in a row direction, multiple source lines S1, S2, and so on extending in a column direction, multiple pixel switching elements 30, multiple pixel electrodes 32, and multiple common electrodes 34. Each pixel switching element 30 is a thin-film transistor provided near an intersection of a gate line and a source line such as to correspond to a pixel. In each pixel switching element 30, the gate is connected with a gate line, the source is connected with a source line, and the drain is connected with a pixel electrode 32. For one common electrode 34, multiple pixel switching elements 30 and multiple pixel electrodes 32 are arranged. The liquid crystal layer is controlled by means of electric fields between pixel electrodes 32 and common electrodes 34. The common electrodes 34 are used for both image display and touch detection. Accordingly, the number of electrode layers can be reduced, so that the display device 22 can be made thinner.

Figure 3:
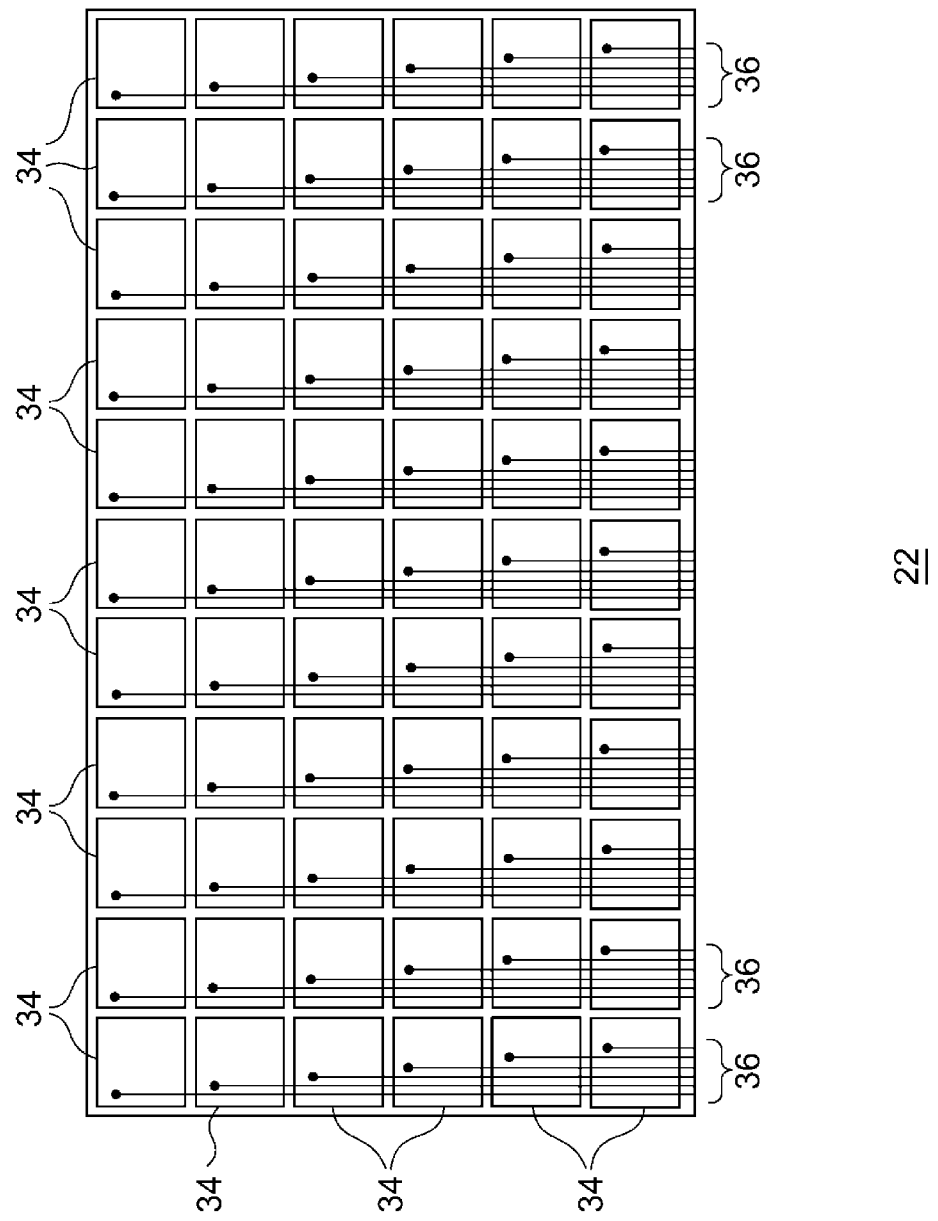
FIG. 3 is a top view that shows arrangement of common electrodes shown in FIG. 2.

FIG. 3 is a top view that shows arrangement of the common electrodes 34 shown in FIG. 2. The multiple common electrodes 34 are arranged in a matrix. Each common electrode 34 is connected to the control device 24 with a signal line 36.

The display device 22 detects a touch position based on the self-capacitance method. When a finger is brought closer to the display surface of the display device 22, capacitance is formed between a common electrode 34 and the finger. The formation of capacitance increases parasitic capacitance in the common electrode 34, so that the current flowing when a touch drive signal is supplied to the common electrode 34 is increased. Based on the current variation, the touch position is detected.

The description now returns to FIG. 1. The control device 24 may be configured as an IC, for example, and controls the display device 22 based on the control data CD and the image data DD from the host 10. The control device 24 includes a control circuit 70, the first drive circuit 72, a second drive circuit 74, and a touch detection circuit 76.

The control circuit 70 may be configured as a microcomputer, for example, and controls signal generation timings of the first drive circuit 72 and the second drive circuit 74, touch detection timings of the touch detection circuit 76, and the like.

The control circuit 70 controls the first drive circuit 72, the second drive circuit 74, and the touch detection circuit 76 such that, during a frame period (one frame period), one frame of a display image is rendered on the display device 22 and touch detection for one screen is performed at least once. The frame period may also be referred to as a vertical synchronization period. The frame period will be detailed later.

The first drive circuit 72 generates a first reference clock signal under the control of the control circuit 70. The first drive circuit 72 also generates, under the control of the control circuit 70, a source signal SS in synchronization with the generated first reference clock signal, based on the image data DD from the host 10. The first drive circuit 72 also generates, under the control of the control circuit 70, a gate signal GS in synchronization with the generated first reference clock signal.

The first drive circuit 72 supplies the source signal SS sequentially to multiple source lines in the display device 22, and also supplies the gate signal GS sequentially to multiple gate lines in the display device 22. The first drive circuit 72 sequentially supplies the image data to be displayed on each pixel as the source signal SS to the source line, and displays the image on each pixel by selecting the pixel, on which the image data is to be displayed, on a line-by-line basis by the gate signal GS.

The first drive circuit 72 supplies the first reference clock signal to the second drive circuit 74. The second drive circuit 74 generates a reference voltage VCOM, which is a predetermined fixed voltage, and a touch drive signal TX, which is a square wave signal in synchronization with the first reference clock signal, under the control of the control circuit 70. Through the signal lines 36 shown in FIG. 3, the second drive circuit 74 supplies the reference voltage VCOM or the touch drive signal TX to the multiple common electrodes 34 included in the display device 22. The multiple common electrodes 34 are arranged in a matrix.

The touch detection circuit 76 detects a touch by an object on the display device 22. Since a capacitance method is adopted in the present embodiment, objects that can be detected are limited to conductors, and insulators cannot be detected.

The touch detection circuit 76 includes a detection value acquirer 76a, a detection value calculator 76b, and a touch detector 76c. Under the control of the control circuit 70, the detection value acquirer 76a acquires a touch detection signal RX received from the common electrode 34 when the touch drive signal TX is supplied to each common electrode 34. The touch detection signal RX represents a detection value that is based on the capacitance of each common electrode 34. The touch detection signal RX is defined by a difference value (also referred to as a delta value) with respect to a reference capacitance of each common electrode 34. The touch detection signal RX has a larger positive value as a finger is brought closer to the common electrode 34. The touch detection signal RX may have a negative value due to the influence of noise. The detection value acquirer 76a acquires the detection values of all the common electrodes 34 by receiving the touch detection signal RX from all the common electrodes 34 in the screen.

Based on the detection values of the plurality of common electrodes 34 acquired by the detection value acquirer 76a, the detection value calculator 76b calculates detection values of a plurality of block regions each including two or more common electrodes among the plurality of common electrodes 34. The specific calculation method for the detection values of the block regions will be described later.

The touch detector 76c detects a touch by a conductor on the display screen of the display device 22 based on the detection value of each of the plurality of block regions calculated by the detection value calculator 76b. The touch detector 76c compares the detection value of each of the plurality of block regions with a predetermined touch detection threshold value, and determines, when the detection value is equal to or greater than the touch detection threshold value, that the block region is receiving a touch. The touch detection circuit 76 detects the touch position in the screen based on the position of the block region determined to be receiving the touch. The touch detector 76c outputs the touch position data on the screen to the control circuit 70 based on the detected touch position.

The control circuit 70 derives coordinate data TD of the touch position based on the touch position data from the touch detector 76c. The control circuit 70 plots the block region determined to be receiving the touch on a coordinate plane. The control circuit 70 derives, for example, the coordinates of the center or the center of gravity of a region formed by a plurality of block regions determined to be receiving a touch as the coordinates of the touch position. The control circuit 70 outputs the derived coordinate data TD to the control device 12 of the host 10. The control device 12 of the host 10 performs various processes based on the coordinate data TD.

The respective configurations of the control device 12 and the control circuit 70 can be implemented by cooperation between hardware resources and software resources or only by hardware resources. As the hardware resources, analog devices, CPUs, DSPs, ROMs, RAMs, ASICs, FPGAs, or other LSIs can be employed. As the software resources, firmware and other programs can be used.

Hereinafter, the control of the display device 22 by the control circuit 70 will be specifically explained. The control circuit 70 alternately repeats a partial touch scan on one of multiple detection regions, which are hereinafter referred to as scan blocks and configured by dividing multiple common electrodes 34 within the screen into multiple groups, and partial image display on one of multiple display regions, which are configured by dividing multiple pixels within the screen into multiple groups, so as to control the touch scan and the image display in a time division manner.

Figure 4:
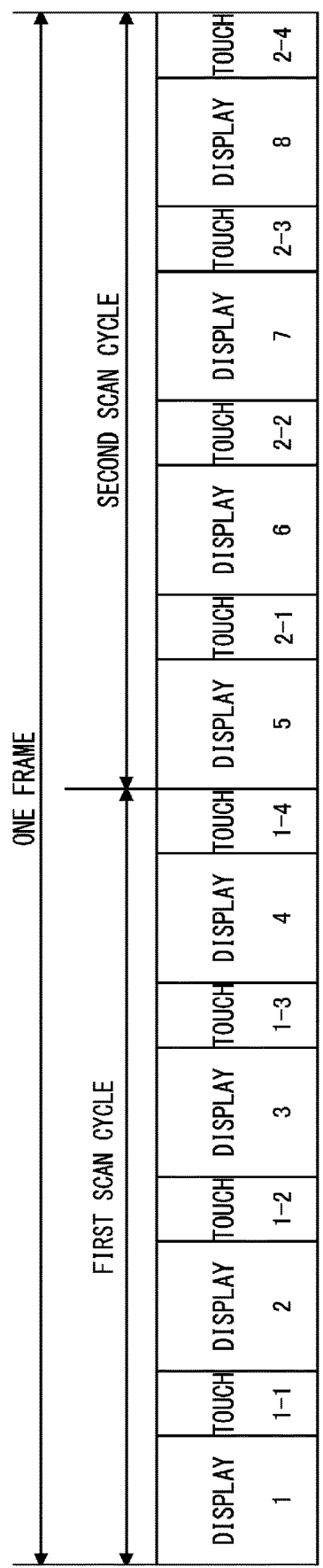
FIG. 4 is a diagram that shows an example of control timings of a control circuit.

FIG. 4 is a diagram that shows an example of control timings of the control circuit 70. In the example shown in FIG. 4, within a frame period (one frame period), one image is displayed and a touch scan is performed twice. In the present embodiment, the display device 22 is assumed to be a display device driven at 60 Hz to display an image, so that the frame period is set to about 16.7 (=1/60) ms. Since the touch scan is performed twice within a frame period, the scan is performed in a 120 Hz period.

In the example shown in FIG. 4, the control circuit 70 forms eight display regions and four scan blocks within the screen. The eight display regions are formed by being sliced at seven sites in the horizontal direction and divided into eight equal parts in the vertical direction. In the following, the display region at the top will be referred to as a first display region, the second display region from the top will be referred to as a second display region, and so on, and the bottommost display region will be referred to as an eighth display region. The four scan blocks are formed, for example, by being sliced at three sites in the vertical direction and being divided into four equal parts in the horizontal direction. In the following, the leftmost scan block will be referred to as a first scan block, the second scan block from the left will be referred to as a second scan block, the third scan block from the left will be referred to as a third scan block, and the rightmost scan block will be referred to as a fourth scan block.

In a frame period, the control circuit 70 controls the image display on the first display region, the touch scan in the first scan block, the image display on the second display region, the touch scan in the second scan block, the image display on the third display region, the touch scan in the third scan block, the image display on the fourth display region, the touch scan in the fourth scan block, the image display on the fifth display region, the touch scan in the first scan block, the image display on the sixth display region, the touch scan in the second scan block, the image display on the seventh display region, the touch scan in the third scan block, the image display on the eighth display region, and the touch scan in the fourth scan block in the order stated. By this control, the control circuit 70 performs a first touch scan during a period when the image of the upper half of the screen is displayed, and a second touch scan during a period when the image of the lower half of the screen is displayed.

FIG. 5A and FIG. 5B are diagrams that compare respective longitudinal sectional views of an out-cell display device and an in-cell display device. FIG. 5A shows the longitudinal sectional view of the out-cell display device, and FIG. 5B shows the longitudinal sectional view of the in-cell display device. In the out-cell display device shown in FIG. 5A, a backlight unit 40, a lower polarizer 42, a thin-film transistor substrate (hereinafter, referred to as a TFT substrate) 44, a liquid crystal layer 52, a color filter substrate 54, an upper polarizer 56, a first bonding layer 57a, a first protection layer 57b, a touch electrode 33b, a second bonding layer 58, and a second protection layer 60 are stacked in this order along the thickness direction.

In the following explanation, in the thickness direction of the display device, the side where the backlight unit 40 is located is the back side, and the side where the second protection layer 60 is located is the front side.

A light emitted from the backlight unit 40 serving as a light source is polarized by the lower polarizer 42, passes through the TFT substrate 44, and becomes incident on the liquid crystal layer 52.

The TFT substrate 44 is stacked in the order of a glass substrate 46, a plurality of gate electrodes 48, a plurality of source electrodes 50, and one common electrode 33a from the back surface to the front surface. Although the illustration thereof is omitted, the TFT substrate 44 also includes a plurality of gate lines, a plurality of source lines, a plurality of pixel electrodes, and a plurality of pixel switching elements.

By the lateral electric fields generated between the plurality of pixel electrodes and the common electrode 33a, the orientation of liquid crystal molecules in the liquid crystal layer 52 is controlled, and the transmission amount of the light entering from the backlight unit 40 is controlled. In the example shown in FIG. 5A, the color filter substrate 54 is coated with four color resists of red (R), green (G), blue (B), and black (BK) on the glass substrate, and a grid or stripe pattern is formed.

The light of each color transmitted through the color filter substrate 54 is polarized by the upper polarizer 56, transmitted through the first bonding layer 57a, the first protection layer 57b, the touch electrode 33b, the second bonding layer 58, and the second protection layer 60, and emitted to the outside.

The first bonding layer 57a is a layer that has translucency and is for bonding the upper polarizer 56 and the first protection layer 57b. The first bonding layer 57a can be formed of, for example, a transparent adhesive sheet such as optically clear adhesive (OCA) or a liquid transparent resin such as optically clear resin (OCR). The first protection layer 57b is a layer that has translucency and that is for protecting the touch electrode 33b. For example, the first protection layer 57b is constituted by a glass substrate or a plastic substrate. The first protection layer 57b is also called a sensor lens or the like.

The touch electrode 33b is an electrode for detecting a touch by a conductor such as a finger or a stylus pen.

The second bonding layer 58 is a layer that has translucency and is for bonding the touch electrode 33b and the second protection layer 60. The second bonding layer 58 can be formed of, for example, a transparent adhesive sheet such as OCA or a liquid transparent resin such as OCR. The second protection layer 60 is a layer that has translucency and that is for protecting the display surface of the display device. For example, the second protection layer 60 is formed of a plastic substrate, a glass substrate, or the like. The second protection layer 60 is also called a cover lens or the like.

In the in-cell display device shown in FIG. 5B, a backlight unit 40, a lower polarizer 42, a TFT substrate 44, a liquid crystal layer 52, a color filter substrate 54, an upper polarizer 56, a bonding layer 58, and a protection layer 60 are stacked in this order along the thickness direction. Hereinafter, the difference from the out-cell display device shown in FIG. 5A will be described.

In the in-cell display device shown in FIG. 5B, the TFT substrate 44 includes a glass substrate 46 and also includes multiple gate electrodes 48, multiple source electrodes 50, and multiple common electrodes 34, which are arranged on the front side of the glass substrate 46. Although the illustration thereof is omitted, the TFT substrate 44 also includes the multiple gate lines G1, G2, and so on, the multiple source lines S1, S2, and so on, the multiple pixel electrodes 32, and the multiple pixel switching elements 30 shown in FIG. 2.

By the lateral electric fields generated between the plurality of pixel electrodes 32 and the plurality of common electrode 34, the orientation of liquid crystal molecules in the liquid crystal layer 52 is controlled, and the transmission amount of the light entering from the backlight unit 40 is controlled. The multiple common electrodes 34 also serve as touch electrodes.

In the in-cell display device shown in FIG. 5B, the first bonding layer 57a, the first protection layer 57b, and the touch electrode 33b in the out-cell display device shown in FIG. 5A are omitted. By omitting these layers, the in-cell display device can be made thinner than the out-cell display device.

However, in the in-cell display device, the distance from the touch electrode to the touch surface becomes longer because the touch electrode is moved to the back side when viewed from the observer, as compared with the out-cell display device. For example, in the out-cell display device shown in FIG. 5A, the distance from the touch electrode 33b to the surface of the second protection layer 60 is designed to be about 1.5 mm, and in the in-cell display device shown in FIG. 5B, the distance from the common electrode 34, which also serves as a touch electrode, to the surface of the protection layer 60 is designed to be about 2.5 mm. Further, in the in-cell display device shown in FIG. 5B, a liquid crystal layer 52 having a lower dielectric constant than that of glass, a color filter substrate 54, an upper polarizer 56, and a bonding layer 58 are interposed between the common electrode 34 and the protection layer 60. Therefore, the in-cell display device has lower touch sensitivity than the out-cell display device. In particular, in display devices for in-vehicle use, a resin cover is often used instead of glass for the protection layer 60 from the viewpoint of safety and an increase in demand for curved displays. In the case of a resin cover, compared to glass, the dielectric constant is lower and the thickness is larger, which lead to a decrease in touch sensitivity.

As a countermeasure against this, in the present embodiment, the noise is flattened by summing up delta values detected by the plurality of adjacent common electrodes 34 (hereinafter, also referred to as cells) so as to increase the signal amount (hereinafter, also referred to as a signal).

FIG. 6A and FIG. 6B are diagrams that show an example of grouping of four cells. FIG. 6A is a diagram showing an example of delta values detected in a plurality of cells arranged in a matrix in the display device 22. FIG. 6A is a diagram in which the delta values detected in the cells of 10×10=100 are arranged directly in a matrix. FIG. 6B is a diagram in which 2×2=4 cells are grouped into one block region and four delta values included in each block region are summed up so as to calculate the delta value of each block region and in which delta values for 9×9=81 block regions are arranged in a matrix. Hereinafter, in a plurality of cells or a plurality of block regions in a matrix, the upper left-most position is defined as (0,0).

A block region Ra0 located at (0,0) shown in FIG. 6B has −8, which is obtained by summing up the respective delta values (0, −2, −4, −2) of four cells located at (0,0), (1,0), (0,1), and (1,1), respectively, that are shown in FIG. 6A. A block region Ra9 located at (0,1) shown in FIG. 6B has −28, which is obtained by summing up the respective delta values (−4, −2, −14, −8) of four cells located at (0,1), (1,1), (0,2), and (1,2), respectively, that are shown in FIG. 6A. When block regions each containing four cells are generated by shifting cells one by one in this way, the delta values of 10×10=100 cells are converted into the delta values of 9×9=81 block regions.

A region Tn shown in FIG. 6A is a site where noise is generated. However, noise is flattened in the corresponding region Tn shown in FIG. 6B. Further, a region Ts shown in FIG. 6A is a site touched by a finger. However, the signal is increased in the corresponding region Ts shown in FIG. 6B.

FIG. 7A and FIG. 7B are diagrams that show an example of grouping of nine cells. FIG. 7A is a diagram showing an example of delta values detected in a plurality of cells arranged in a matrix in the display device 22. FIG. 7A is a diagram in which the delta values detected in the cells of 10×10=100 are arranged directly in a matrix. The values are the same as those in FIG. 6A. FIG. 7B is a diagram in which 3×3=9 cells are grouped into one block region and nine delta values included in each block region are summed up so as to calculate the delta value of each block region and in which delta values for 8×8=64 block regions are arranged in a matrix.

A block region Rb7 located at (7,0) shown in FIG. 7B has 5, which is obtained by summing up the respective delta values (−4, 4, −4, 0, 7, 0, −2, 2, 2) of nine cells located at (7,0), (8,0), (9,0), (7,1), (8,1), (9,1), (7,2), (8,2), and (9,2), respectively, that are shown in FIG. 7A. A block region Rb15 located at (7,1) shown in FIG. 7B has 1, which is obtained by summing up the respective delta values (0, 7, 0, −2, 2, 2, 0, −4, −4) of nine cells located at (7,1), (8,1), (9,1), (7,2), (8,2), (9,2), (7,3), (8,3), and (9,3), respectively, that are shown in FIG. 7A. When block regions each containing nine cells are generated by shifting cells one by one in this way, the delta values of 10×10=100 cells are converted into the delta values of 8×8=64 block regions.

Generation of the delta values of block regions at the four corners from the delta values of 2×2=4 cells and generation of the delta values of block regions at the ends other than the four corners from the delta values of 2×3 or 3×2=6 cells allow for the generation of the same number of block regions Rb as the number of cells.

A region Tn shown in FIG. 7A is a site where noise is generated. However, noise is flattened in the corresponding region Tn shown in FIG. 7B. Further, a region Ts shown in FIG. 7A is a site touched by a finger. However, the signal is increased in the corresponding region Ts shown in FIG. 7B.

Figure 8A:
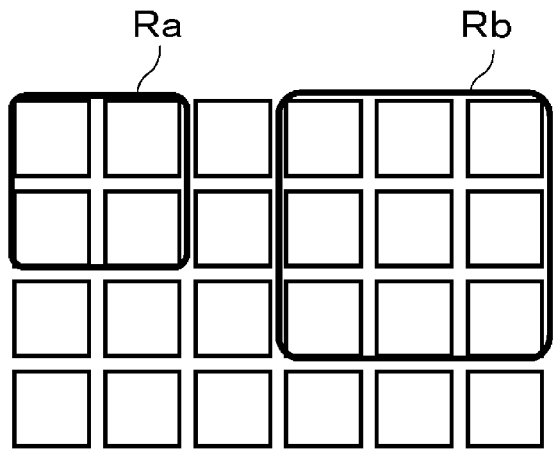
FIG. 8A shows an example of grouping of positive direction blocks of m rows and n columns (m and n are equal to each other and are integers of two or more)
Figure 8B:
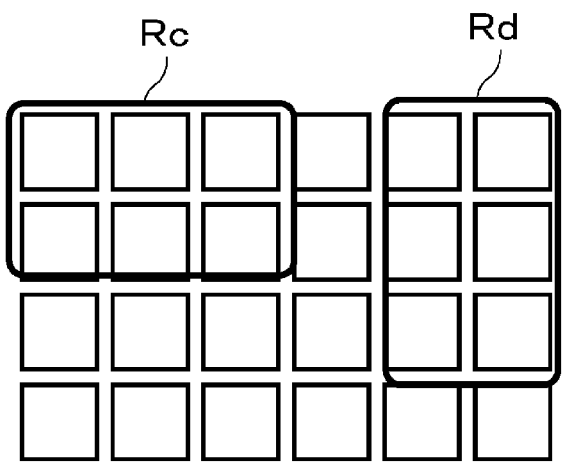
FIG. 8B shows an example of grouping of rectangular blocks of m rows and n columns (m and n are not equal to each other and are integers of one or more)
Figure 8C:
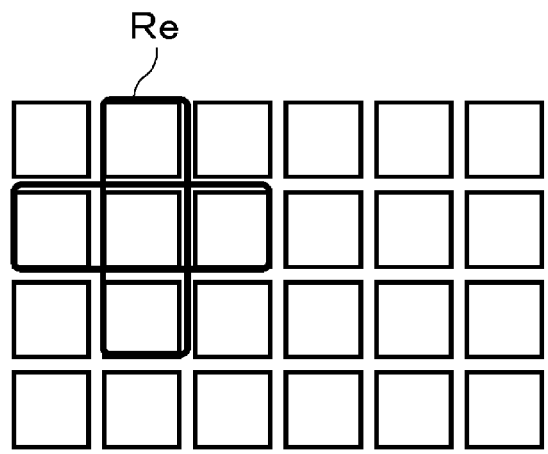
FIG. 8C shows an example of grouping of cross blocks.

FIG. 8A, FIG. 8B and FIG. 8C are diagrams that show examples of the shape of a block region in which a plurality of cells are grouped. FIG. 8A shows an example of grouping of square blocks of m rows and n columns (m and n are equal to each other and are integers of two or more), and a block region Ra containing 2×2=4 cells and a block region Rb containing 3×3=9 cells are shown. A block region containing 4×4=16 cells is possible. A block region containing an even number of cells is advantageous when a capacitance peak occurs between cells, and a block region containing an odd number of cells is advantageous when a capacitance peak occurs on a cell.

FIG. 8B shows an example of grouping of rectangular blocks of m rows and n columns (m and n are not equal to each other and are integers of one or more), and a block region Rc containing 2×3=6 cells and a block region Rd containing 3×2=6 cells are shown. The rectangular block regions can be shaped to match the aspect ratio of the display device 22. Since many horizontally long display devices 22 are used for in-vehicle use, a horizontally long rectangular block region Rc may be employed. Further, for use in smartphones, a vertically long rectangular block region Rd may be employed. The vertically long rectangular block region Rd also matches the shape of a fingertip.

FIG. 8C shows an example of grouping of cross blocks, and a block region Re containing four cells is shown. The shape of the block region in which a plurality of cells are grouped is not limited to shapes shown in FIG. 8A, FIG. 8B and FIG. 8C. For example, a block region having a shape similar to a circle, a hexagon, an octagon, or the like may be used.

Figure 9A:
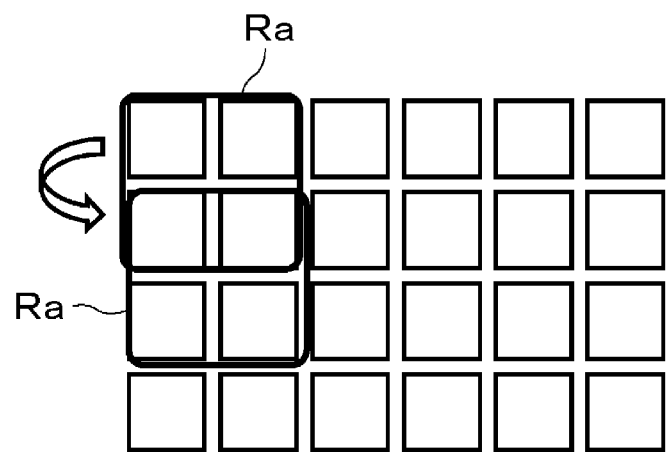
FIG. 9A is an example in which each block region within the screen is generated in a state where the block region overlaps with another adjacent block region.
Figure 9B:
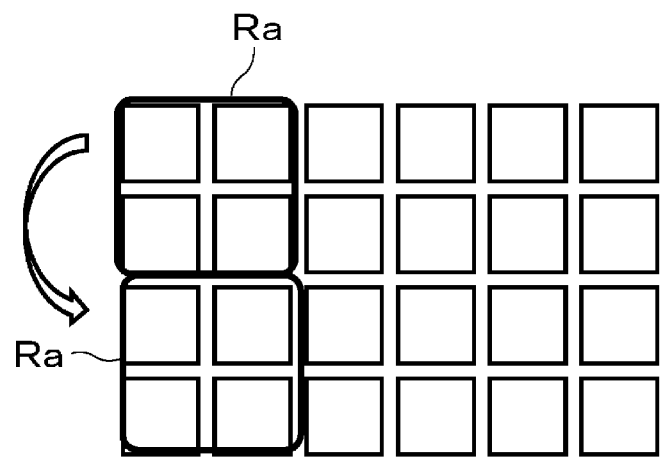
FIG. 9B is an example in which each block region within the screen is not generated in a state where the block region overlaps with another adjacent block region.

FIG. 9A and FIG. 9B are diagrams that show a method of generating a block region in a screen. FIG. 9A is an example in which each block region within the screen is generated in a state where the block region overlaps with another adjacent block region. More specifically, a block region Ra containing 2×2=4 cells is generated every time the block region is shifted by one cell. By generating block regions Ra through the shifting in units of one cell, all cells can be scanned with high resolution.

FIG. 9B is an example in which each block region within the screen is not generated in a state where the block region overlaps with another adjacent block region. More specifically, a block region Ra containing 2×2=4 cells is generated every time the block region is shifted by one block. The calculation load can be reduced by generating block regions Ra through the shifting in units of one block. The resolution at the time of scanning is lower than that in a case where the block regions are generated through the shifting in units of one cell shown in FIG. 9A.

Although not shown in FIG. 9A, FIG. 9B and FIG. 9C, a block region containing 3×3=9 cells or more may be generated by shifting the block region by two cells. In this case, the resolution at the time of scanning is between the resolution in the generation method shown in FIG. 9A and the resolution in the generation method shown in FIG. 9B.

When block regions are generated as shown in FIG. 9A, each of the plurality of block regions within the screen includes at least one common electrode 34 shared with other block regions. More specifically, a plurality of block regions having the following relationships are generated. When there are a first common electrode, a second common electrode, and a third common electrode adjacent to one another in the screen, a block region in the screen includes the first common electrode and the second common electrode and does not include the third common electrode. Another block region in the screen includes the second common electrode and the third common electrode and does not include the first common electrode.

First Calculation Method for Delta Value of Block Region

Figure 10A:
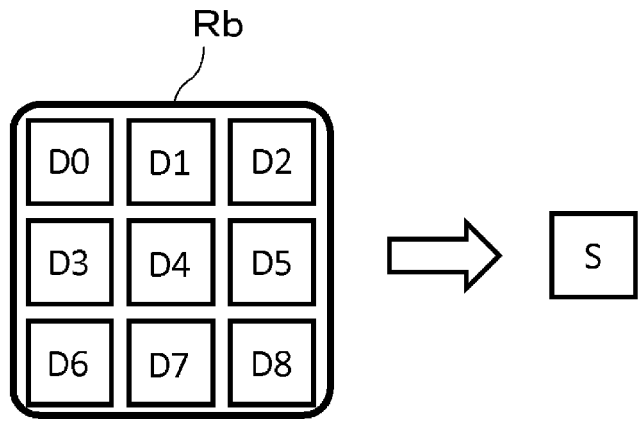
FIG. 10A shows a first calculation method for the delta value of a block region Rb containing 3×3=9 cells.
Figure 10B:
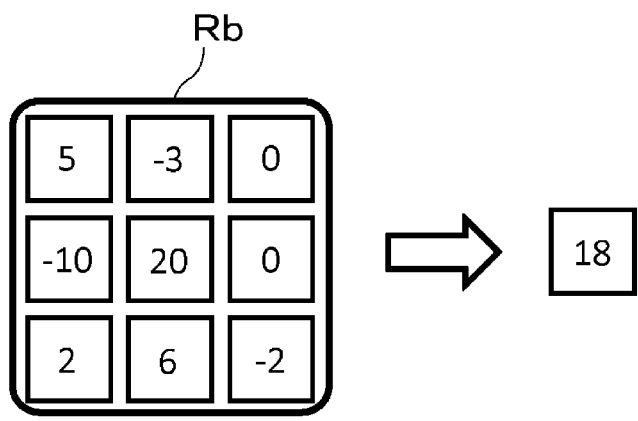
FIG. 10B is a diagram that shows the first specific example according to the first calculation method for the delta value of a block region Rb containing 3×3=9 cells.
Figure 10C:
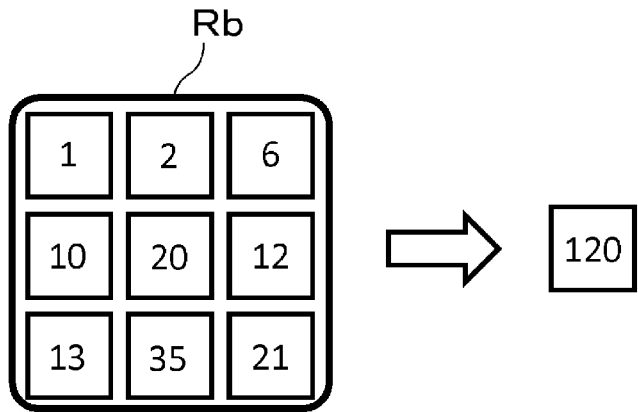
FIG. 10C is a diagram that shows the second specific example according to the first calculation method for the delta value of a block region Rb containing 3×3=9 cells.

FIG. 10A, FIG. 10B and FIG. 10C are diagrams for explaining a first calculation method for a delta value in a block region. FIG. 10A shows a first calculation method for the delta value of a block region Rb containing 3×3=9 cells. In the first calculation method, as shown in the following (Equation 1), a delta value S of the block region is calculated by summing up all the delta value of a plurality of cells included in the block region.

$$S = \text{Sum} (D0, D1, \ldots, Dn) \quad \text{(Equation 1)}$$

FIG. 10B is a diagram that shows the first specific example according to the first calculation method for the delta value of a block region Rb containing 3×3=9 cells. In the first specific example, the delta value S of the block region Rb is equal to (5−3+0−10+20+0+2+6−2)=18. FIG. 10C is a diagram that shows the second specific example according to the first calculation method for the delta value of a block region Rb containing 3×3=9 cells. In the second specific example, the delta value S of the block region Rb is equal to (1+2+6+10+20+12+13+35+21)=120. In the first calculation method, the noise can be flattened and the signal can be emphasized by summing up all the delta values of a plurality of cells included in a block region.

Second Calculation Method for Delta Value of Block Region

Figure 11A:
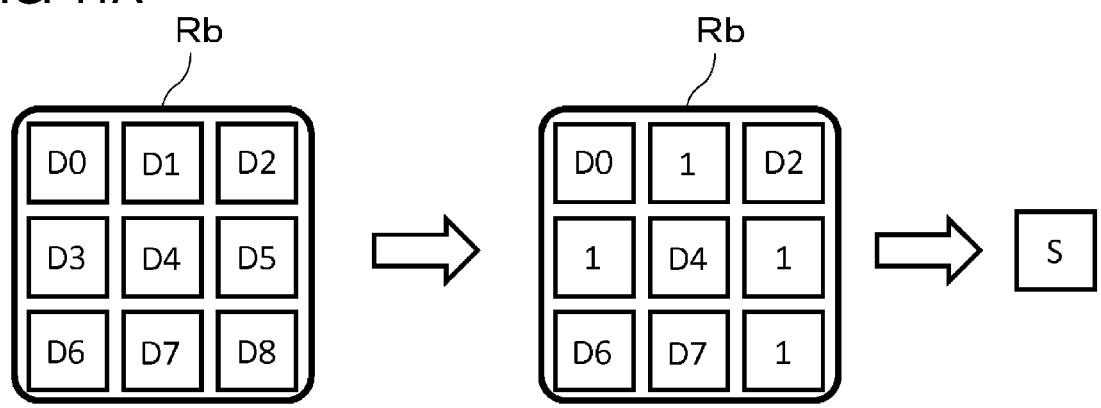
FIG. 11A shows a second calculation method for the delta value of a block region Rb containing 3×3=9 cells.
Figure 11B:
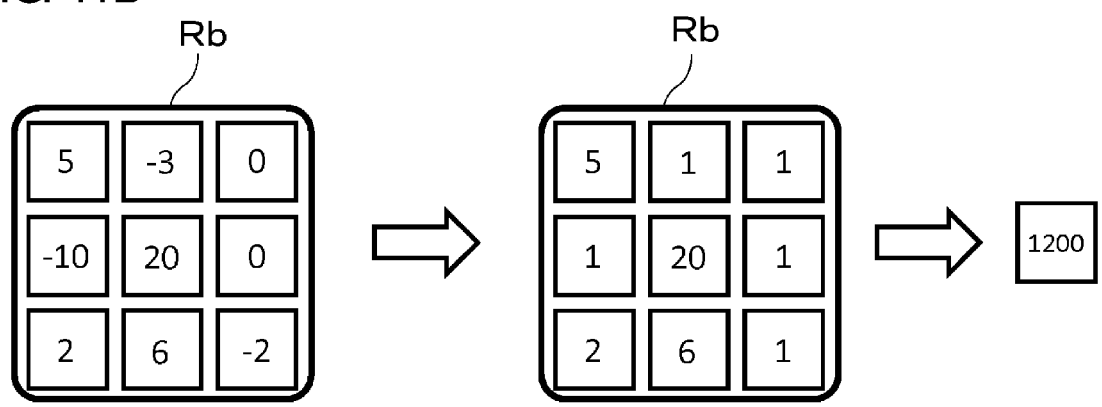
FIG. 11B is a diagram that shows a specific example according to the second calculation method for the delta value of a block region Rb containing 3×3=9 cells.

FIG. 11A, FIG. 11B and FIG. 11C are diagrams for explaining a second calculation method for a delta value in a block region. FIG. 11A shows a second calculation method for the delta value of a block region Rb containing 3×3=9 cells. In the second calculation method, as shown in the following (Equation 2), a delta value S of the block region is calculated by converting delta values of a plurality of cells included in the block region that are equal to zero or below to one and then multiplying all the delta values of the cells after the conversion by one another.

$$S = \text{If } (D0<=0,1,D0) * \text{If } (D1<=0,1,D1) *, \ldots, * \text{If } (Dn<=0,1,Dn) \quad \text{(Equation 2)}$$

FIG. 11B is a diagram that shows a specific example according to the second calculation method for the delta value of a block region Rb containing 3×3=9 cells. In the specific example, the delta value S of the block region Rb is equal to (5*1*1*20*1*2*6*1)=1200. In the second calculation method, the signal can be emphasized by converting delta values of a plurality of cells included in the block region that are equal to zero or below to one and then multiplying all the delta values of the cells after the conversion by one another. In the second calculation method, although the noise is also emphasized, the difference between the signal and the noise becomes more remarkable.

Weighting of Delta Value of Block Region

Figure 12A:
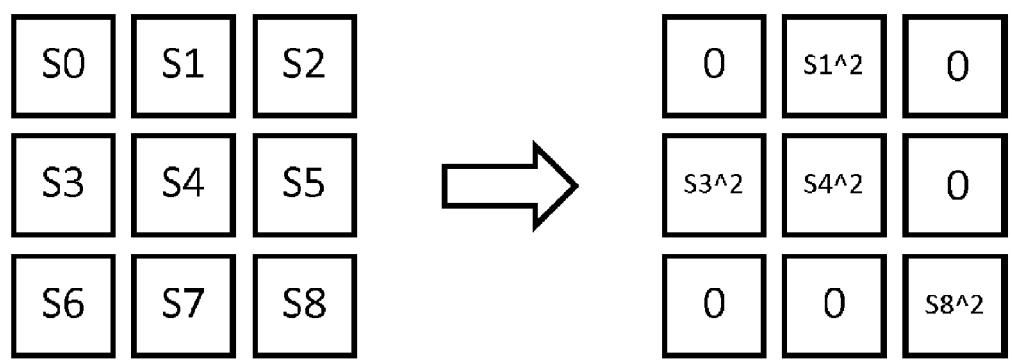
FIG. 12A is a diagram for explaining a delta value weighting method for a plurality of block regions in the screen.
Figure 12B:
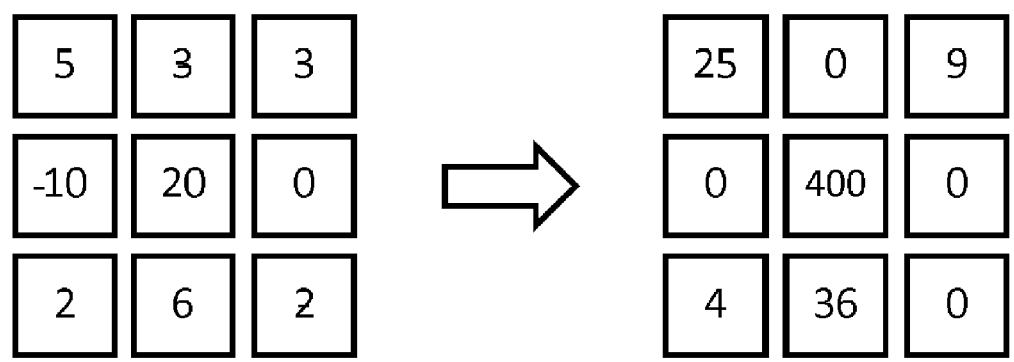
FIG. 12B shows a specific example of weighting process of delta values of 3×3=9 block regions.

FIG. 12A, FIG. 12B and FIG. 12C are diagrams for explaining a delta value weighting method for a plurality of block regions in the screen. In FIG. 12A and FIG. 12B, 3×3=9 block regions are drawn in order to simplify the figures. However, a delta value Si of all the block regions included in the screen is subject to weighting. As shown in the following (Equation 3), the delta value Si of the block region is converted to zero when the value is a negative value and is exponentiated when the value is a positive value, and a delta value Si' obtained after a weighting process is derived.

$$Si' = \text{If } (Si<0, 0, Si^2) \quad \text{(Equation 3)}$$

FIG. 12B shows a specific example of weighting process of delta values of 3×3=9 block regions. In the specific example, delta values S (5, −3, 3, −10, −20, 0, 2, 6, −2) of the nine block regions are converted to delta values S' (25, 0, 9, 0, 400, 0, 4, 36, 0) through a weighting process. By the weighting process, the signal is emphasized. Although the noise is also emphasized by the weighting process, the difference between the signal and the noise becomes more remarkable.

Figure 13A:
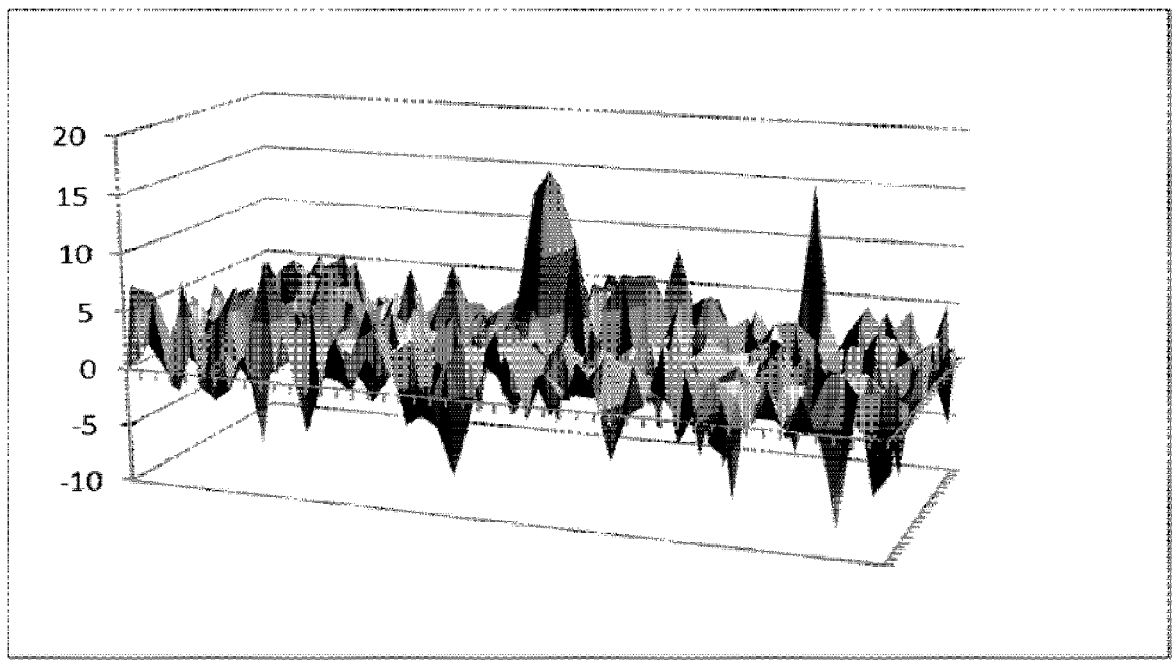
FIG. 13A shows raw delta values detected in a plurality of cells included in the screen.
Figure 13B:
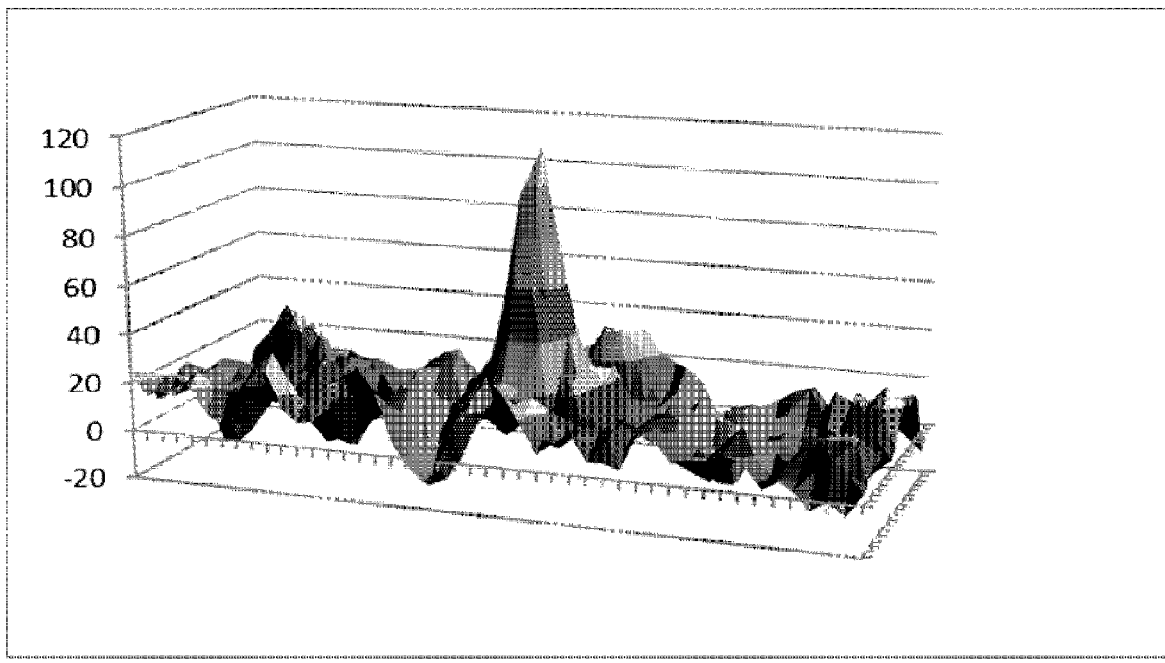
FIG. 13B shows the delta values of a plurality of block regions generated by grouping of nine cells.
Figure 13C:
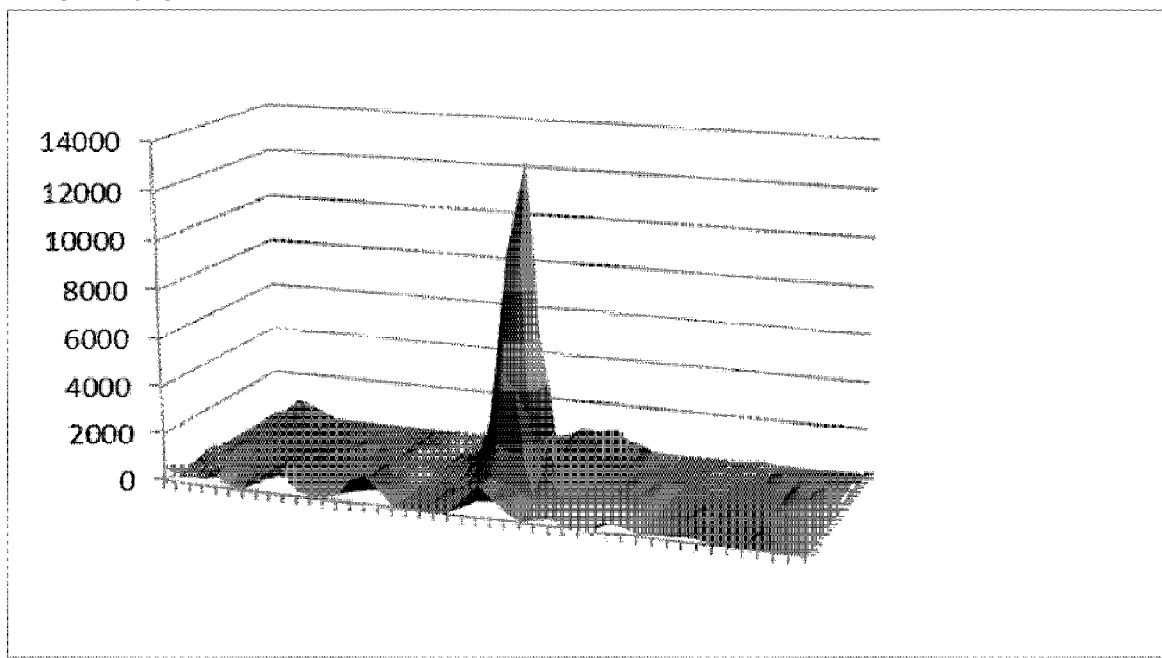
FIG. 13C shows the delta values of the plurality of block regions after a weighting process is performed.

FIG. 13A, FIG. 13B and FIG. 13C are diagrams that show specific examples of a delta value in one screen in three-dimensional graphs. The specific examples are examples of grouping of nine cells in which 3×3=9 cells are grouped to generate one block region. The delta value of each block region is calculated by the first calculation method, and the weighting process described above is further performed.

FIG. 13A shows raw delta values detected in a plurality of cells included in the screen, FIG. 13B shows the delta values of a plurality of block regions generated by grouping of nine cells, and FIG. 13C shows the delta values of the plurality of block regions after a weighting process is performed. The X-axis and Y-axis indicate spatial positions in the screen, and the Z-axis indicates delta values.

Delta values for one screen shown in FIG. 13A are in a state in which a signal-to-noise ratio (SNR) is small. In the delta values for one screen shown in FIG. 13B, the noise is flattened and the signal is emphasized, thereby improving the SNR. In the delta values for one screen shown in FIG. 13C, the SNR is further improved by a weighting process. As a result of this, even a weak signal such as a glove touch can be detected.

First Operation Example

Figure 14:
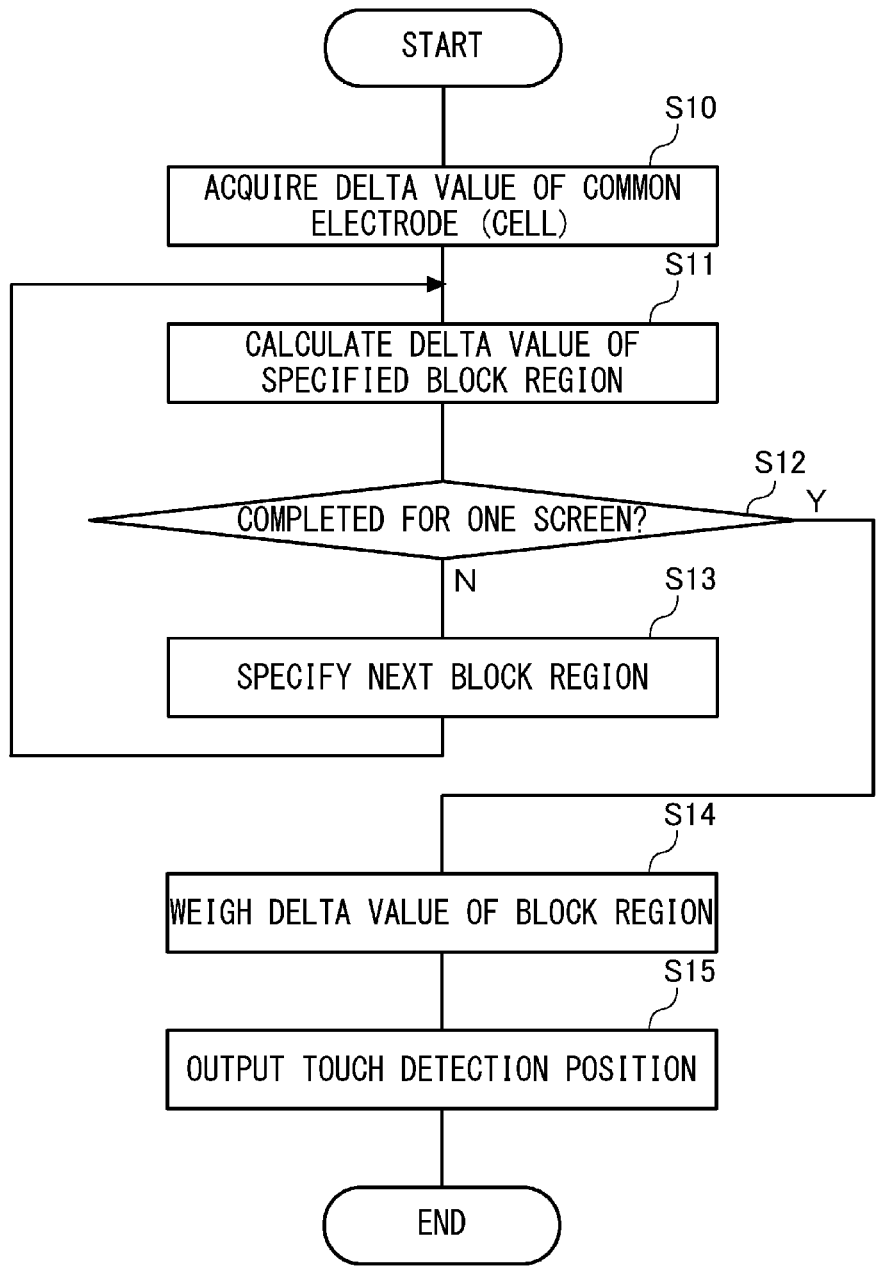
FIG. 14 is a flowchart for explaining a first operation example of a touch detection process performed by a control device according to the embodiment.

FIG. 14 is a flowchart for explaining a first operation example of a touch detection process performed by a control device 24 according to the embodiment. The detection value acquirer 76a receives a touch detection signal RX from the plurality of common electrodes 34 in the screen and acquires the delta values of the plurality of cells in the screen (S10). The detection value acquirer 76a temporarily stores the acquired delta values in a frame buffer (not shown). Based on the delta values of a plurality of cells included in a specified block region in the screen, the detection value calculator 76b calculates the delta value of the specified block region (S11). At this time, the delta value of the specified block region is associated with, for example, the center coordinates or the center of gravity coordinates of the block region. The delta value may be output in association with the center coordinates or the center of gravity coordinates of the block region. For example, when 3×3=9 cells are grouped so as to generate one block region, the calculated delta value of the block region may be output in association with the coordinate position of the cell, which is the center of the nine cells. Further, when 2×2=4 cells are grouped so as to generate one block region, the calculated delta value of the block region may be output in association with the coordinates of the boundary part of the cells, which is the center position of the four cells. Depending on the shape of the block region, the calculated delta value of the block region may be output in association with the coordinates of the position of the center of gravity of a figure indicated by the block region.

When the calculation of the delta values of block regions for one screen is not completed (N in S12), the detection value calculator 76b specifies the next block region (S13). The step transitions to step S11. When the calculation of the delta values of the block regions for one screen is completed (Y in S12), the detection value calculator 76b weights each of the respective delta values of the plurality of block regions for one screen (S14).

The touch detector 76c compares the weighted delta values of the plurality of block regions with a predetermined touch detection threshold value, and determines that block regions whose delta value is equal to or greater than the predetermined touch detection threshold value is receiving a touch. The touch detector 76c outputs the position information of the block regions determined to be receiving a touch to the control circuit 70 (S15). The control circuit 70 derives coordinate data TD of a touch position based on the position information of the block regions determined to be receiving the touch acquired from the touch detector 76c.

The touch detector 76c may output the weighted delta values of the plurality of block regions for one screen directly to the control circuit 70. In this case, the control circuit 70 detects the touch position based on the delta values of the plurality of block regions for one screen acquired from the touch detector 76c, and derives the coordinate data TD of the detected touch position. In this case, the control circuit 70 can also detect the pressure sensitivity at the touch position.

Second Operation Example

As described above, when the delta values of a plurality of cells are grouped to generate the delta value of a block region, a wide range of data is rounded, and the resolution therefore decreases in proportion to the size of the block region. Therefore, in the second operation example, when the delta value of a block region is equal to or greater than a grouping threshold value, the grouping in the block region is cancelled, and the size of the block region is reduced.

FIG. 15A, FIG. 15B and FIG. 15C are diagrams for explaining cancellation of grouping in a block region. FIG. 15A shows raw delta values detected in a plurality of cells included in the screen, FIG. 15B shows the delta values of a plurality of block regions generated by grouping of nine cells, and FIG. 15C shows the delta values of a plurality of block regions generated by grouping of four cells.

Figure 16A:
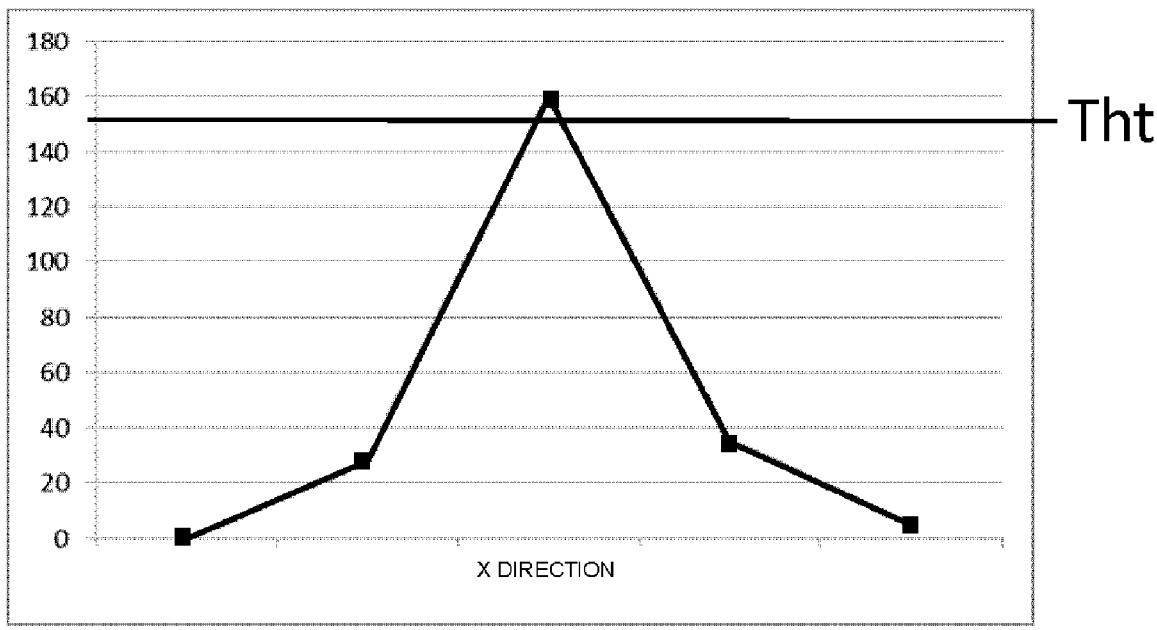
FIG. 16A is diagram showing delta values in the third row from the bottom of FIG. 15A in a graph in the X direction.
Figure 16B:
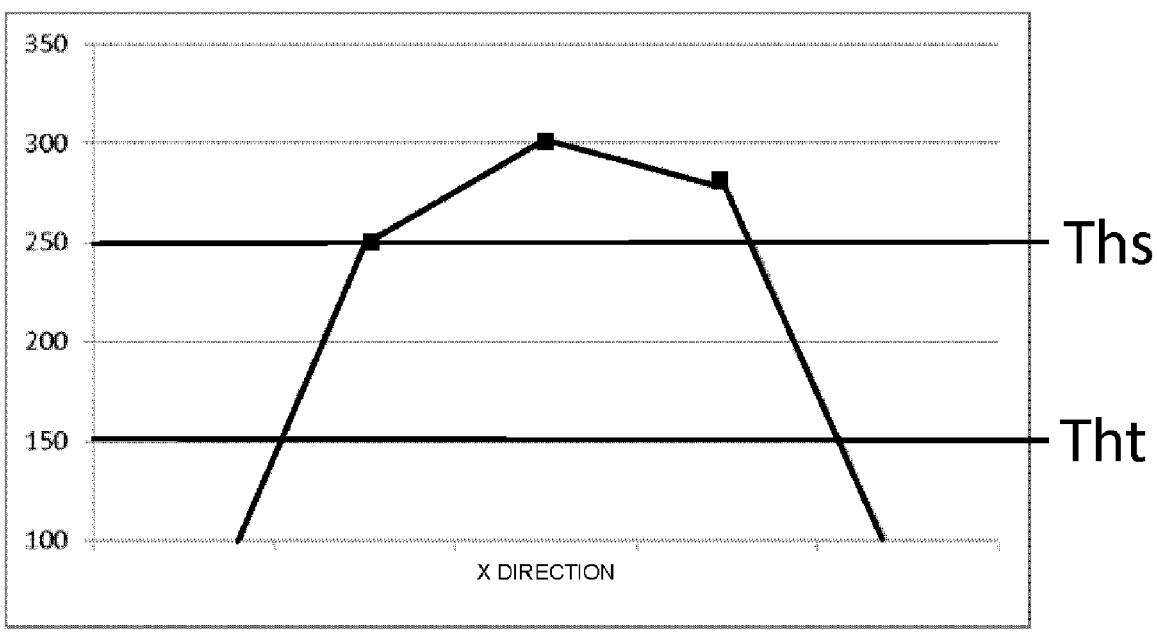
FIG. 16B is a diagram showing delta values in the second row from the bottom of FIG. 15B in a graph in the X direction.

FIG. 16A, FIG. 16B and FIG. 16C are diagrams that show delta values in the X direction of a certain row shown in FIG. 15A, FIG. 15B and FIG. 15C in graphs. FIG. 16A is diagram showing delta values in the third row from the bottom of FIG. 15A in a graph in the X direction, and FIG. 16B is a diagram showing delta values in the second row from the bottom of FIG. 15B in a graph in the X direction, and FIG. 16C is a diagram showing delta values in the second row from the bottom of FIG. 15C in a graph in the X direction.

In examples shown in FIG. 16A, FIG. 16B and FIG. 16C, a touch detection threshold value THh is set to 150, and a grouping threshold value THs is set to 250. The values of the touch detection threshold value THh and the grouping threshold value THs are examples, and values derived by the designer based on experiments and simulations are used according to the specifications of a display device 22 to be used. The grouping threshold value THs is a threshold value for determining whether or not to cancel the grouping in a block region. Since the signal amount is sufficiently large when the delta value is equal to or greater than the grouping threshold value THs, there is a high possibility that the signal amount for touch detection is sufficient even if the size of the block region is reduced. On the other hand, as the size of the block region becomes smaller, the touch position can be specified in more detail, and the touch position detection accuracy is thus improved. Therefore, in the second operation example, when the delta value of the block region is equal to or greater than the grouping threshold value THs, the size of the block region is reduced.

Regarding the delta values of the plurality of block regions generated by the grouping of nine cells shown in FIG. 15B, the delta values of three block regions Rb52, Rb53, and Rb54 are equal to or greater than the grouping threshold value THs. Block regions in which a delta value equal to or greater than the threshold value THs is detected are released, and block grouping of one less size is performed on regions containing nine cells that constituted the released block regions. In the example shown in FIG. 15B, the three block regions Rb52, Rb53, and Rb54 are released, and grouping of four cells is performed on a region Rp containing 15 cells that constituted the three released block regions Rb52, Rb53, and Rb54 as shown in FIG. 15C. Thereby, delta values of eight block regions are newly calculated. Since the calculated delta values of the eight block regions are all less than the grouping threshold value THs, the block size is not further reduced.

Regarding the delta values of the eight block regions generated by the grouping of four cells shown in FIG. 15C, the delta values of two block regions Ra68 and Ra69 are equal to or greater than the touch detection threshold value THt. Therefore, it is determined that the two block regions Ra68 and Ra69 are receiving a touch.

If the delta value of the block region Ra69 in FIG. 15C is 250 or more, the block region Ra69 is released, and regarding four cells that constituted the released block region Ra69, the delta value of each cell and the touch detection threshold value THt are compared. In this example, among the four cells, the delta value of a cell D76 shown in FIG. 15A is equal to or greater than the touch detection threshold value THt, and the region of the cell D76 is therefore determined to be receiving a touch. As described above, it can be found that the smaller the size of a block region, the smaller the area of a region determined to be receiving a touch, and the touch position can be detected with higher definition.

Figure 17:
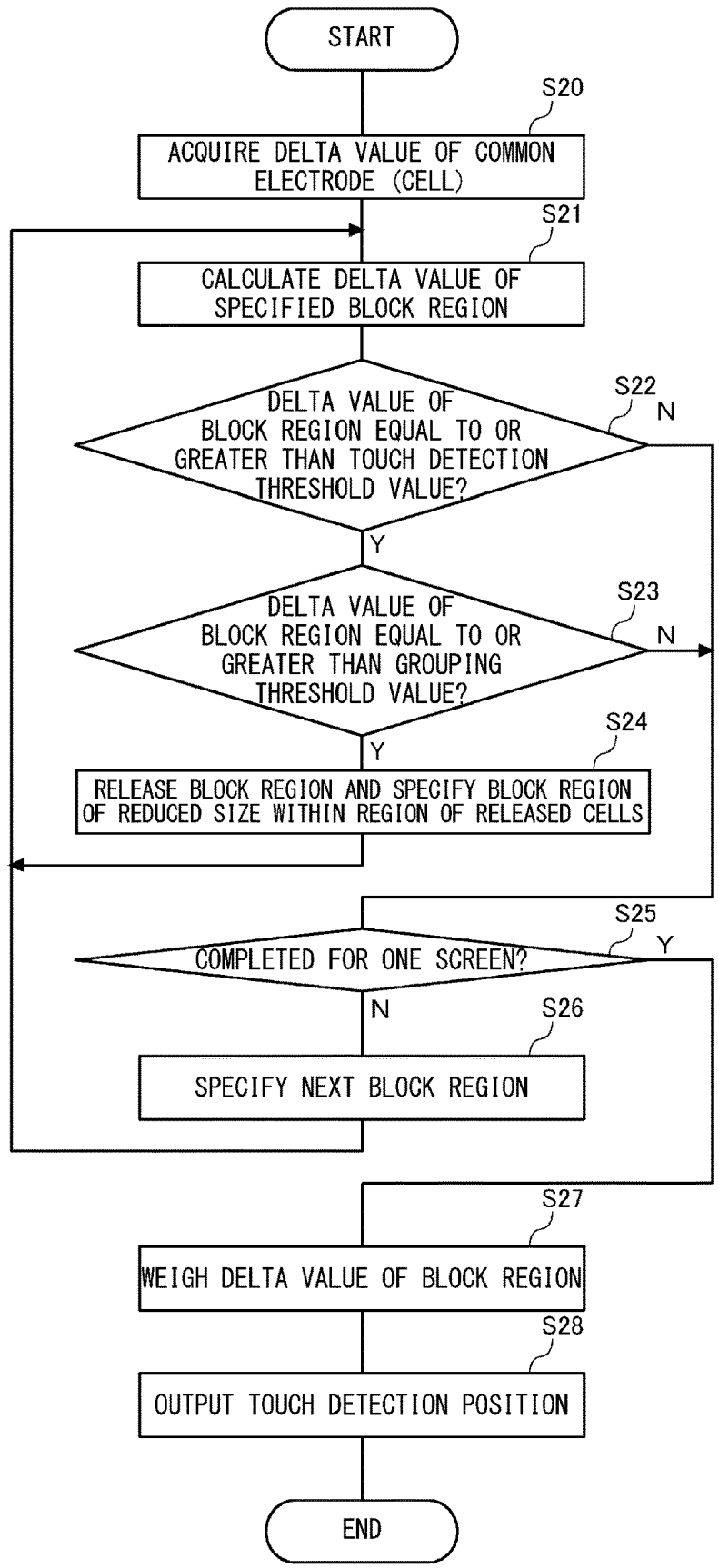
FIG. 17 is a flowchart for explaining a second operation example of the touch detection process performed by the control device according to the embodiment.

FIG. 17 is a flowchart for explaining the second operation example of a touch detection process performed by a control device 24 according to the embodiment. The detection value acquirer 76a receives a touch detection signal RX from the plurality of common electrodes 34 in the screen and acquires the delta values of the plurality of cells in the screen (S20). The detection value acquirer 76a temporarily stores the acquired delta values in a frame buffer (not shown). Based on the delta values of a plurality of cells included in a specified block region in the screen, the detection value calculator 76b calculates the delta value of the specified block region (S21). As the size of an initial block region, the largest size among the sizes of block regions used in this operation example is used. In this operation example, the following block regions of three sizes are used: a nine-cell grouped block region containing 3×3=9 cells; a four-cell grouped block region containing 2×2=4 cells; and a block region containing one cell (=cell region). The block region used initially is a nine-cell grouped block region.

The touch detector 76c compares the calculated delta value of the block region with the touch detection threshold value THt (S22). When the delta value is equal to or greater than the touch detection threshold value THt (Y in S22), the touch detector 76c compares the delta value with the grouping threshold value THs (S23). When the delta value is equal to or greater than the grouping threshold value THs (Y in S23), the touch detector 76c releases the block region and specifies a block region whose size has been reduced by one unit within the range of cells that constituted the released block region (S24). The step transitions to step S21.

When the delta value is less than the touch detection threshold value THt in step S22 (N in S22), or when the delta value is less than the grouping threshold value THs in step S23 (N in S23), the process proceeds to step S25.

In step S25, the detection value calculator 76b determines whether or not the calculation of the delta values of block regions for one screen is completed (S25). When the calculation is not completed (N in S25), the detection value calculator 76b specifies the next block region (S26). When a block region is released, the detection value calculator 76b specifies a block region of a reduced size within the range of cells that constituted the released block region. When all the calculation of the delta value of the reduced block region within the range of the released cells is completed, the detection value calculator 76b specifies the next block region after bringing the block region back to the initial size within a range following the range of the released cells. The step transitions to step S21.

In the step S25, when the calculation of the delta values of the block regions for one screen is completed (Y in S25), the detection value calculator 76b weights each of the respective delta values of the plurality of block regions for one screen (S27).

The touch detector 76c outputs the position information of a block region determined to be receiving a touch or the delta values of the plurality of block regions for one screen to the control circuit 70 (S28). Block regions having different sizes may be mixed in the plurality of block regions. The control circuit 70 derives coordinate data TD of a touch position based on the position information of the block region determined to be receiving the touch acquired from the touch detector 76c. Alternatively, the control circuit 70 detects the touch position based on the delta values of the plurality of block regions for one screen acquired from the touch detector 76c, and derives the coordinate data TD of the detected touch position. In the latter case, the process in step S27 may be omitted.

FIG. 18A, FIG. 18B and FIG. 18C are diagrams that show an example of a method of generating a block region shown in FIG. 9A. FIG. 18A shows raw delta values detected in a plurality of cells included in the screen, FIG. 18B shows the delta values of a plurality of block regions generated by grouping of four cells, and FIG. 18C shows the delta values of a plurality of block regions generated by grouping of nine cells. FIG. 18A, FIG. 18B and FIG. 18C are examples of simply dividing the screen into a plurality of block regions, and no overlapping cells are generated between the block regions.

FIG. 19A, FIG. 19B and FIG. 19C are diagrams that show an example of a method of generating a block region shown in FIG. 9B. FIG. 19A shows raw delta values detected in a plurality of cells included in the screen, FIG. 19B shows the delta values of a plurality of block regions generated by grouping of four cells, and FIG. 19C shows the delta values of a plurality of block regions generated by grouping of nine cells. FIG. 19A, FIG. 19B and FIG. 19C are examples of generating a block region by shifting a block region by one cell at a time in the screen, and overlapping cells are generated between adjacent block regions.

Figure 20A:
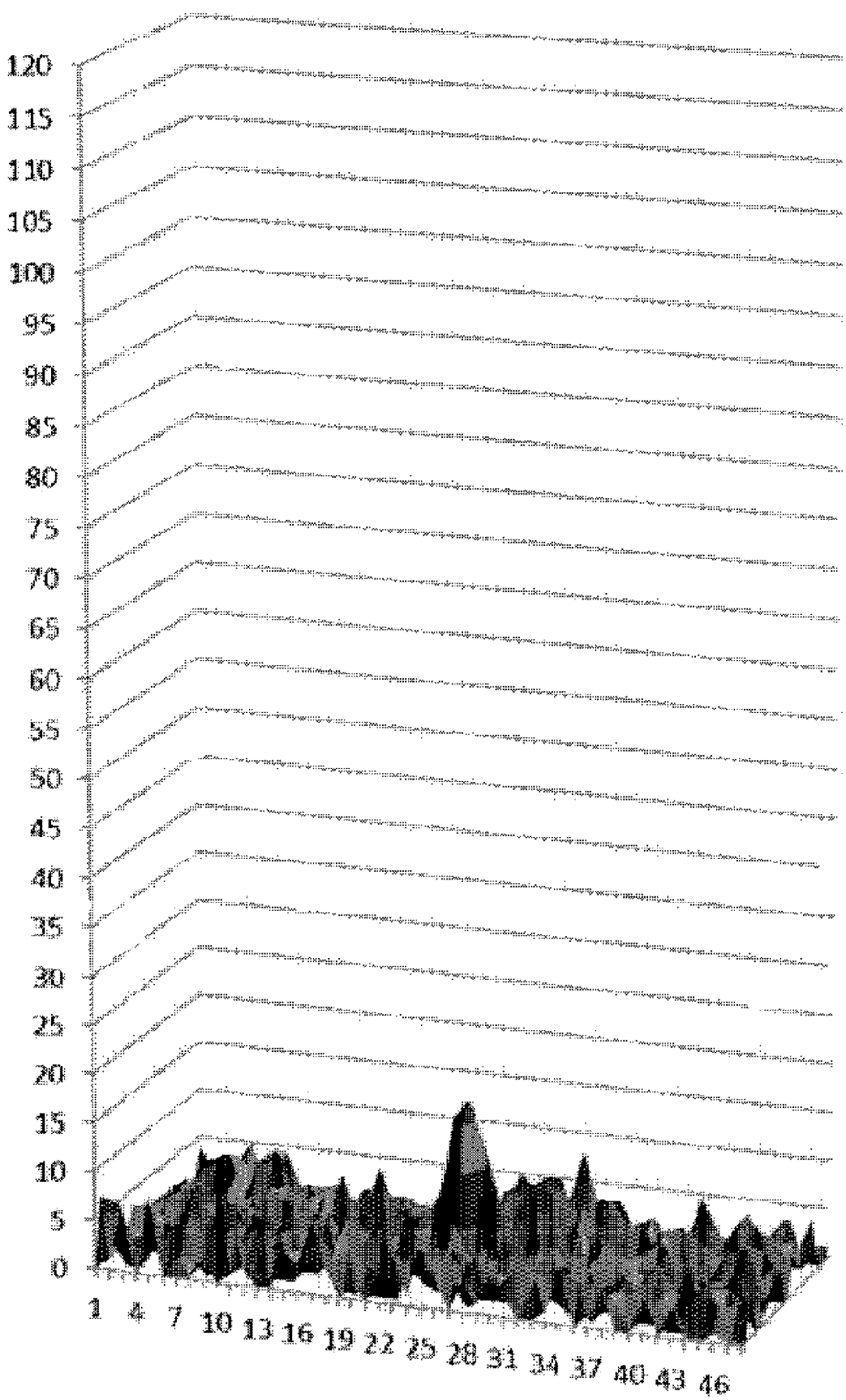
FIG. 20A is a diagram that show delta values for one screen shown in each of FIG. 18A in a three-dimensional graph.
Figure 20B:
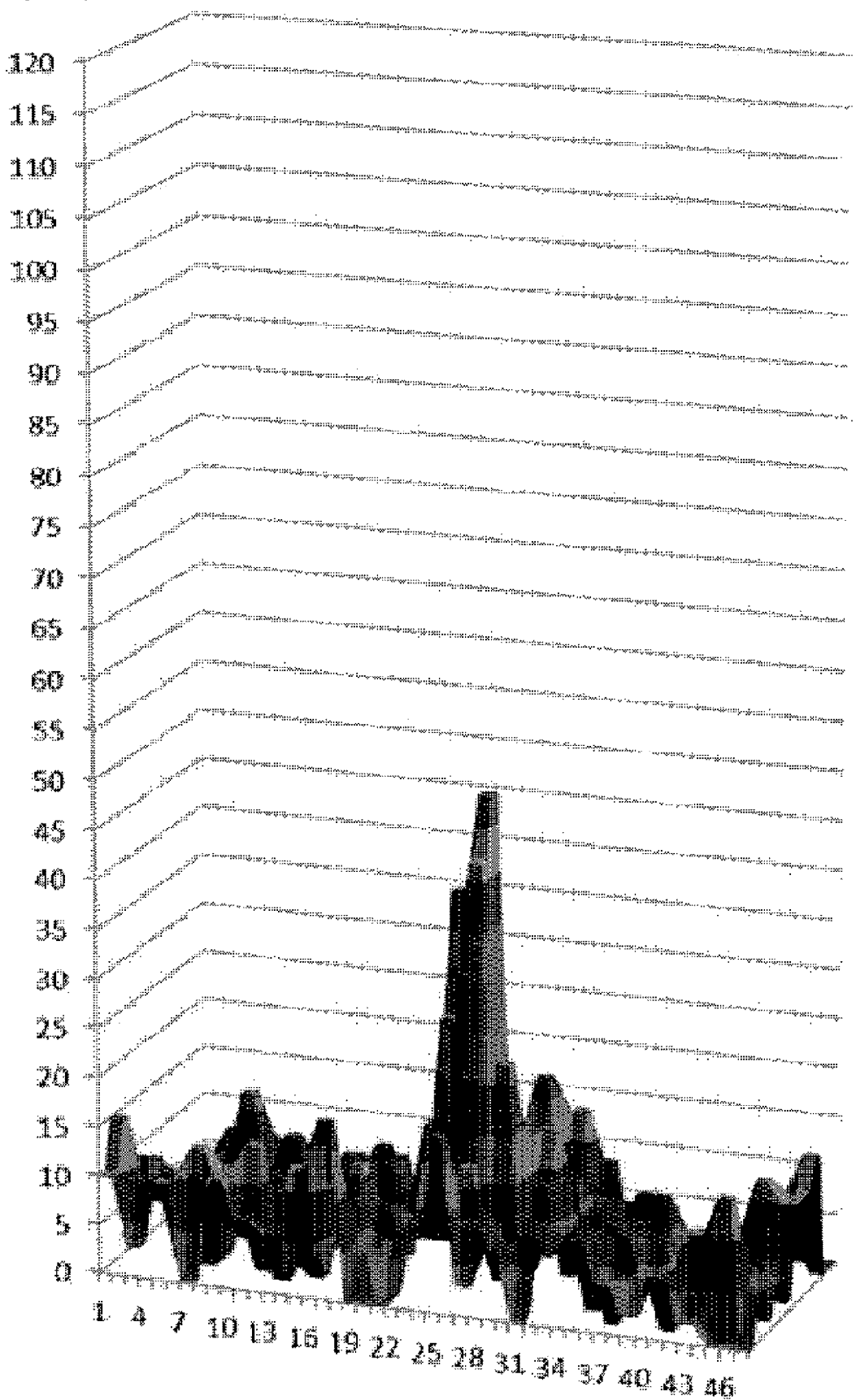
FIG. 20B is a diagram that show delta values for one screen shown in each of FIG. 18B in a three-dimensional graph.
Figure 20C:
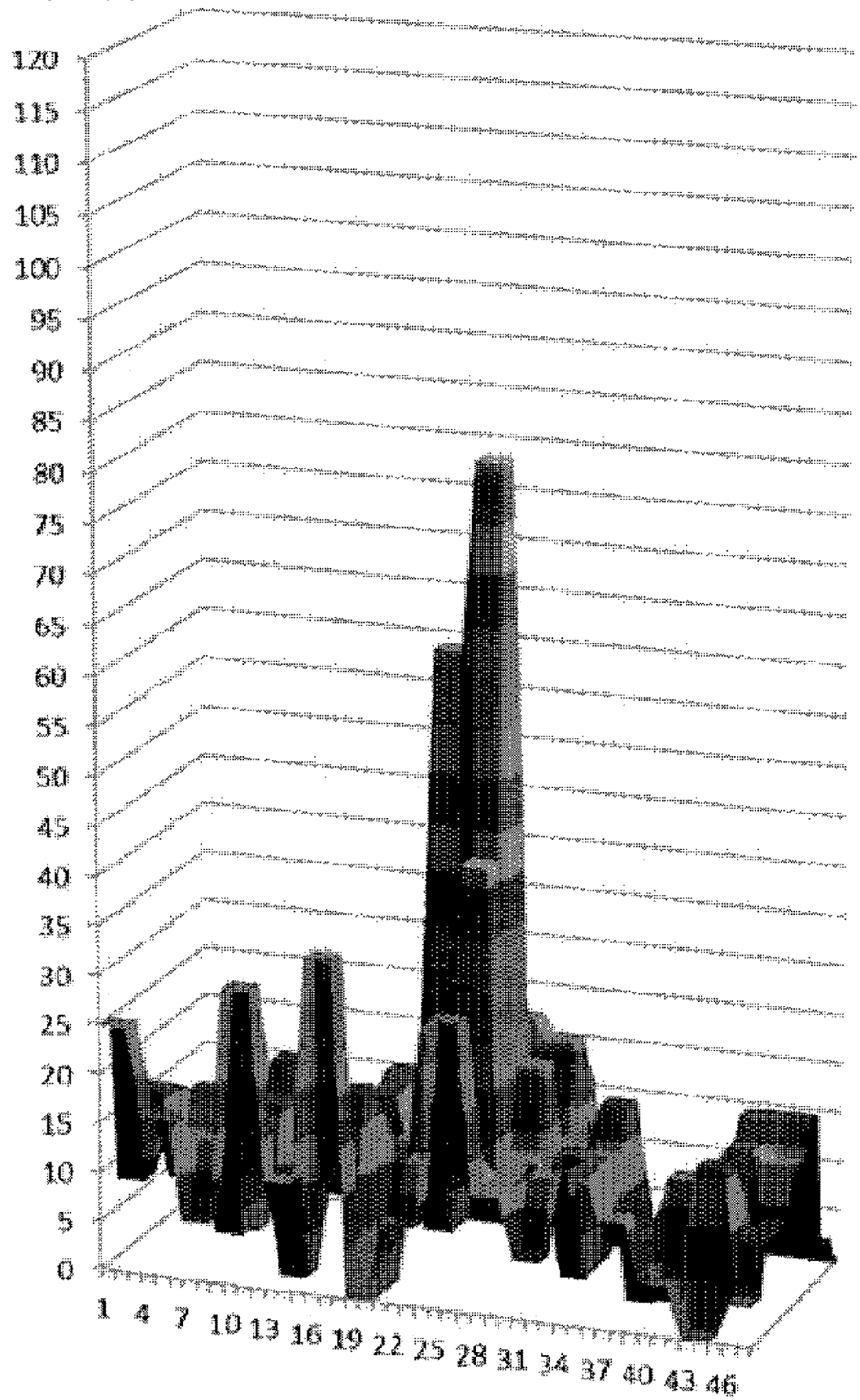
FIG. 20C is a diagram that show delta values for one screen shown in each of FIG. 18C in a three-dimensional graph.
Figure 21A:
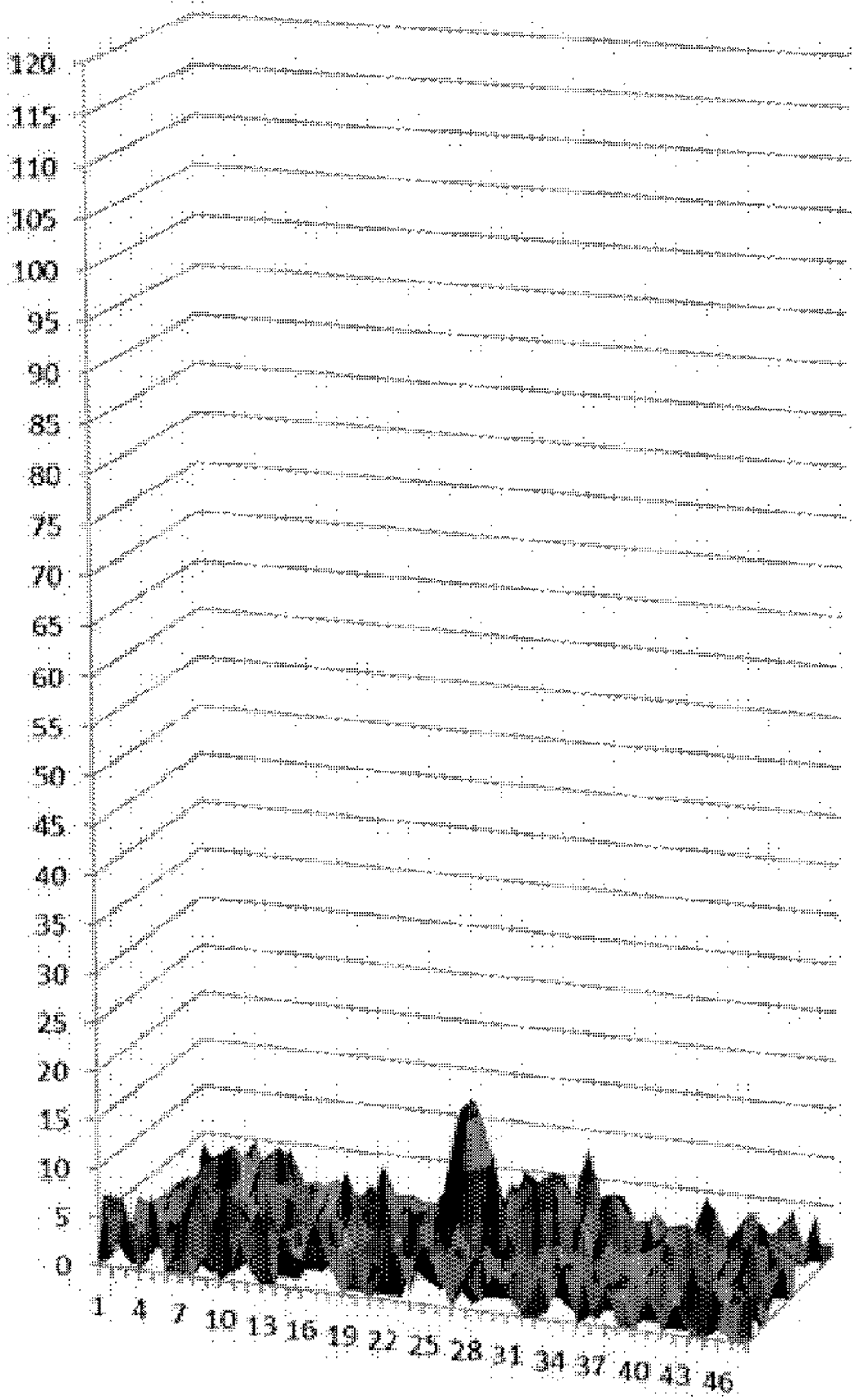
FIG. 21A is a diagrams that show delta values for one screen shown in each of FIG. 19A in a three-dimensional graph.
Figure 21B:
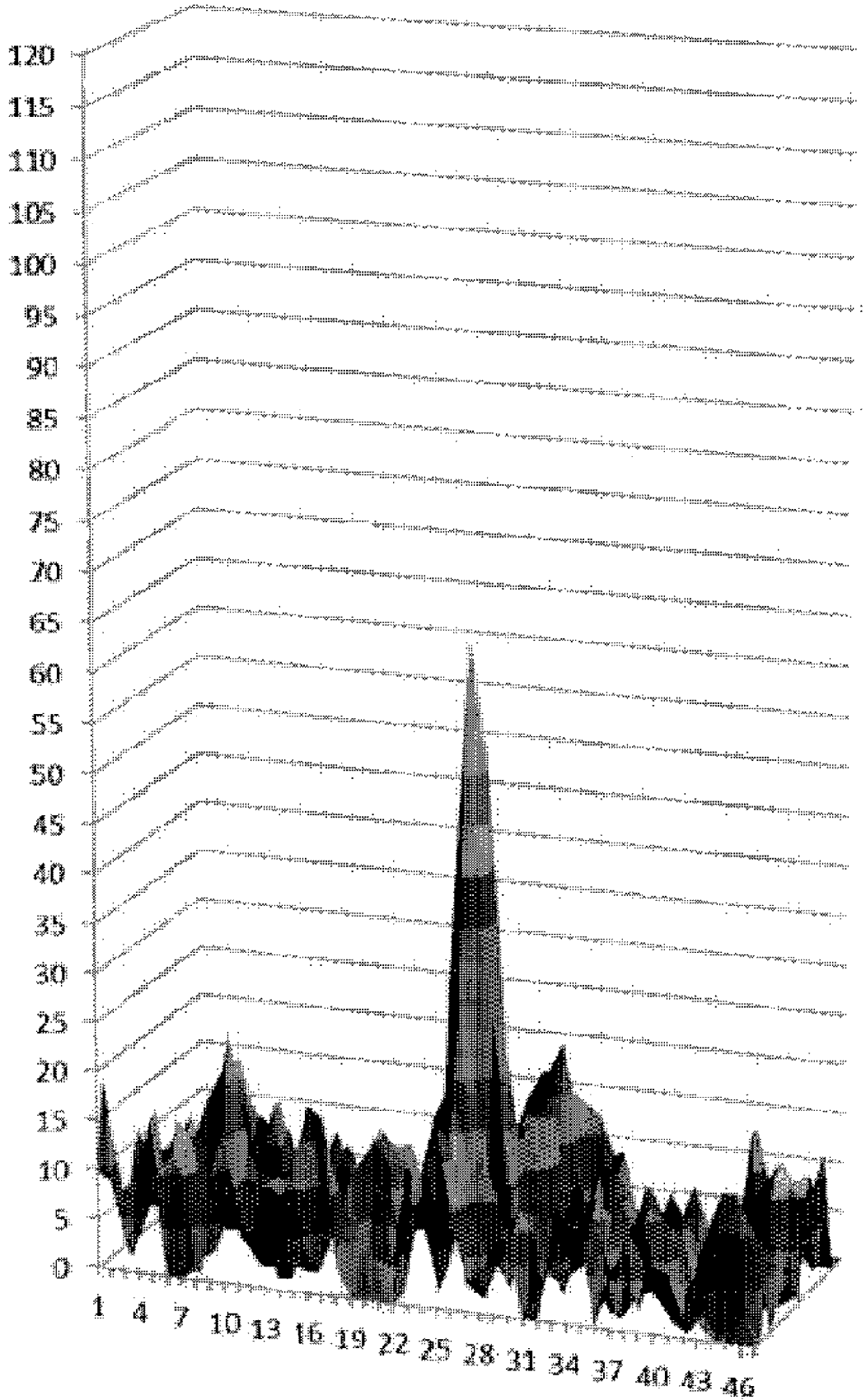
FIG. 21B is a diagrams that show delta values for one screen shown in each of FIG. 19B in a three-dimensional graph.
Figure 21C:
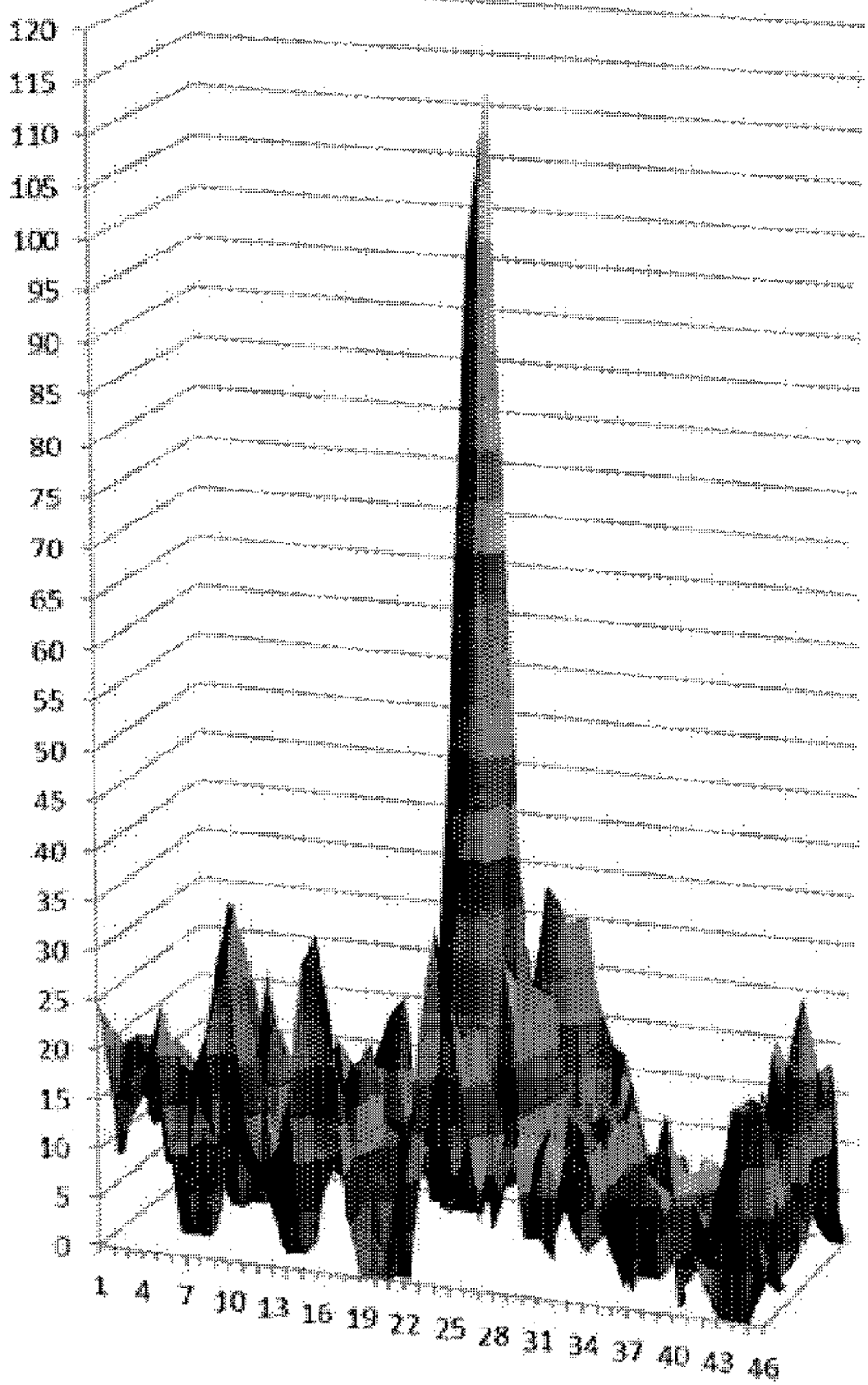
FIG. 21C is a diagrams that show delta values for one screen shown in each of FIG. 19C in a three-dimensional graph.

FIG. 20A, FIG. 20B and FIG. 20C are diagrams that show delta values for one screen shown in each of FIG. 18A, FIG. 18B and FIG. 18C in three-dimensional graphs. FIG. 21A, FIG. 21B and FIG. 21C are diagrams that show delta values for one screen shown in each of FIG. 19A, FIG. 19B and FIG. 19C in three-dimensional graphs. Comparing FIG. 20A, FIG. 20B and FIG. 20C with FIG. 21A, FIG. 21B and FIG. 21C, the apex of a peak of delta values is sharper in the latter. This means that the area of a touch position can be detected in a small size and the touch position can be detected in a more pinpoint manner. In the former, the apex of the peak of the delta values is flat, the area of the apex increases in proportion to the size of the block size, and the area of a detected touch position increases. Therefore, in the former method, the resolution becomes coarser in proportion to the size of the block size, and the coordinate detection accuracy of the touch position decreases. On the other hand, in the latter method, the resolution is almost the same regardless of the size of the block size, and it is possible to suppress a decrease in the coordinate detection accuracy of the touch position.

As explained above, according to the present embodiment, noise can be flattened and the signal can be increased by generating delta values in units of blocks by combining delta values detected in a plurality of cells. By increasing the signal, the sensitivity of touch detection can be improved. The touch detection method according to the present embodiment is particularly effective for an in-cell display device in which the distance from the touch surface to the touch electrode is long.

Further, in a block region where the delta value is equal to or greater than the grouping threshold value, the touch position can be detected with higher definition by reducing the block size.

Described above is an explanation based on the embodiments of the present disclosure. The embodiments are intended to be illustrative only, and it will be obvious to those skilled in the art that various modifications to constituting elements or processes could be developed and that such modifications are also within the scope of the present disclosure.

In the second operation example described above, when a block region is released, the delta value of a reduced block region is calculated within the range of cells that constituted the released block region. In this regard, a range for calculating the delta value of the reduced block region may be wider than the range of the cells that constituted the released block region. For example, the range may be a range obtained by adding one column of cells to all sides of the range of the cells that constituted the released block region. The columns added on all sides may be two or more columns.

In the above-described embodiment, a frame buffer is provided in the touch detection circuit 76, delta values for one screen are stored, and the position information of a block region determined to be receiving a touch in units of one screen or the delta values of block regions for one screen are output to the control circuit 70. In this regard, the touch detector 76c may store delta values in units of scan blocks described above and output the position information of a block region determined to be receiving a touch in units of scan blocks or the delta values of block regions for one scan block to the control circuit 70. In this case, the report rate is improved.

Figure 22:
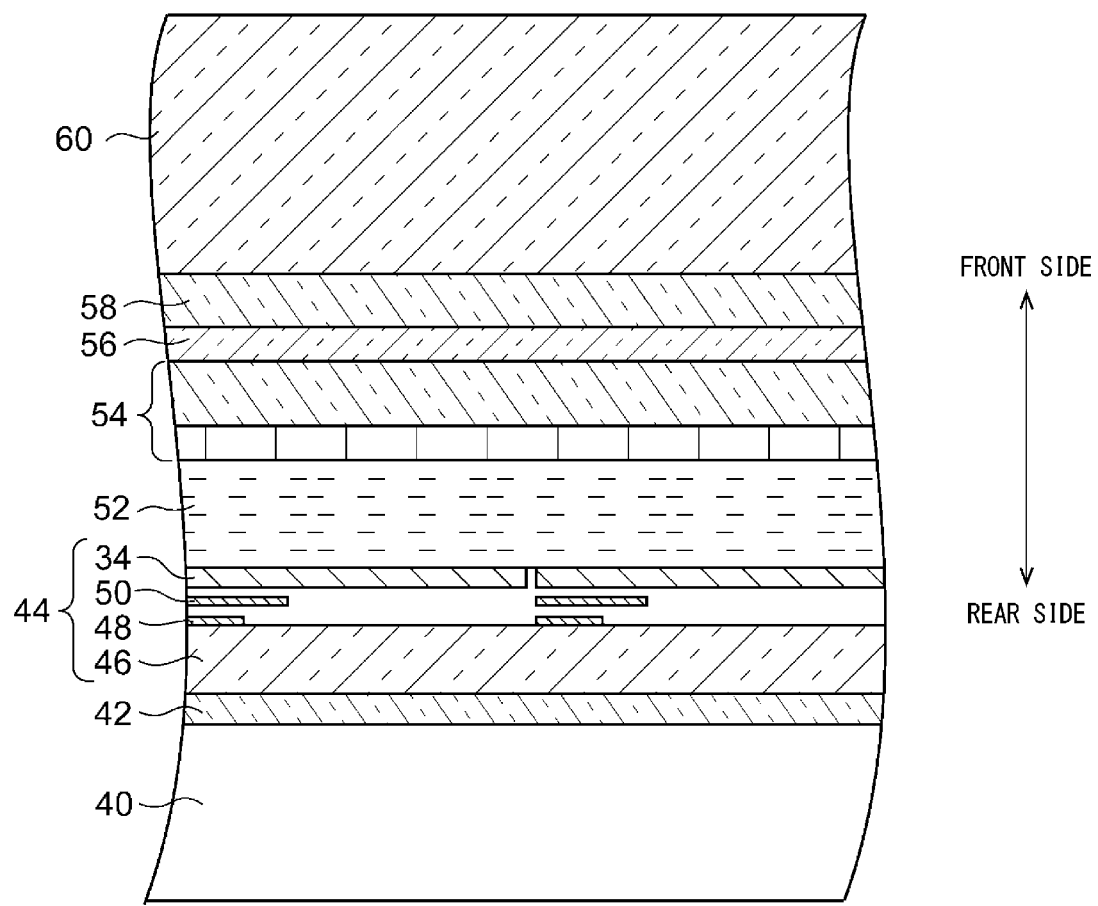
FIG. 22 is a detailed diagram of FIG. 5B.

FIG. 22 is a detailed diagram of FIG. 5B. The display device 22 includes a backlight unit 40, a lower polarizer 42, a thin-film transistor substrate (hereinafter, referred to as a TFT substrate) 44, a liquid crystal layer 52, a color filter substrate 54, an upper polarizer 56, a bonding layer 58, and a protection layer 60, which are laminated and disposed in this order along a depth direction.

In the following, with regard to the depth directions of the display device 22, the side on which the protection layer 60 is positioned with respect to the TFT substrate 44 is defined as the front side, and the opposite side is defined as the rear side.

Using the light emitted from the backlight unit 40, the display device 22 emits image light toward the front side, or the viewer side.

The TFT substrate 44 includes a glass substrate 46 and also includes multiple gate electrodes 48, multiple source electrodes 50, and multiple common electrodes 34, which are arranged on the front side of the glass substrate 46. The TFT substrate 44 also includes the multiple gate lines G1, G2, and so on, the multiple source lines S1, S2, and so on, the multiple pixel electrodes 32, and the multiple pixel switching elements 30 shown in FIG. 2, though the illustration thereof is omitted. The liquid crystal layer 52 disposed on the front side of the TFT substrate 44 is controlled by means of lateral electric fields that occur between pixel electrodes 32 and common electrodes 34.

The bonding layer 58 has translucency and bonds the upper polarizer 56 and the protection layer 60. The bonding layer 58 may be formed by curing transparent resin in a liquid state, such as optically clear resin (OCR), or curing a transparent adhesive sheet, such as optically clear adhesive (OCA), for example.

The protection layer 60 is a layer that has translucency and protects the display device 22, and the protection layer 60 is constituted by a glass substrate or a plastic substrate, for example. The protection layer 60 is also called a cover lens, for example.

In the above-described embodiments, an example of applying the touch detection method according to the present disclosure to an in-cell display device has been described. However, the touch detection method can also be applied to an out-cell display device.

The embodiments can be expressed as described below.

A touch detection device (24) according to one aspect of the present disclosure is a touch detection device (24) of a display device (22) including a plurality of common electrodes (34) arranged in a matrix and used for image display and touch detection, including:

a detection value acquirer (76a) that acquires a plurality of detection values that are based on capacitance of each of the plurality of common electrodes (34);

a detection value calculator (76b) that calculates detection values in a plurality of block regions each containing two or more common electrodes (34) out of the plurality of common electrodes (34) based on the plurality of detection values acquired by the detection value acquirer (76a); and a touch detector (76c) that detects a touch by a conductor on a display screen of the display device (22) based on the detection value of each of the plurality of block regions calculated by the detection value calculator (76b), wherein the plurality of block regions include at least a first block region and a second block region, the first block region includes at least a first common electrode out of the plurality of common electrodes (34) and a second common electrode adjacent to the first common electrode out of the plurality of common electrodes, the second block region includes at least the second common electrode and a third common electrode adjacent to the second common electrode out of the plurality of common electrodes (34) and different from the first common electrode, and the detection value calculator (76b) calculates the detection value of each of the plurality of block regions in the display screen based on the detection value of each of the two or more common electrodes (34) included in each of the plurality of block regions.

The "touch detector" may be configured by the touch detector 76c alone or a combination of the touch detector 76c and the control circuit 70.

This allows the touch detection sensitivity to be improved by flattening the noise and increasing the signal.

In the touch detection device (24) according to one aspect of the present disclosure, for example, each of the plurality of block regions may include at least one common electrode shared with other block regions.

According to this, it is possible to generate a plurality of block regions having substantially the same resolution as the resolution of the plurality of common electrodes (34).

In the touch detection device (24) according to one aspect of the present disclosure, for example, the detection value calculator (76b) may acquire a difference value with respect to a reference capacitance of the common electrodes (34) as the detection value and sum up the respective detection values of the two or more common electrodes (34) included in the plurality of block regions so as to calculate the detection values of the block regions. This allows detection values in which the noise is flattened and the signal is increased to be calculated. In the touch detection device (24) according to one aspect of the present disclosure, for example, the detection value calculator (76b) may acquire a difference value with respect to a reference capacitance of the common electrodes (34) as the detection value, convert detection values of the two or more common electrodes (34) included in the block region that are equal to zero or below to one, and then multiply the plurality of detection values after the conversion by one another so as to calculate the detection value of the block region.

This allows detection values in which the noise is flattened and the signal is increased to be calculated.

In the touch detection device (24) according to one aspect of the present disclosure, for example, the detection value calculator (76b) may convert detection values of the plurality of block regions that are negative values to zero and amplifies detection values of the plurality of block regions that are positive values.

This allows detection values in which the noise is flattened and the signal is increased to be calculated.

In the touch detection device (24) according to one aspect of the present disclosure, for example, the plurality of block regions may be rectangular regions each including a plurality of common electrodes (34).

This allows for easy designing.

In the touch detection device (24) according to one aspect of the present disclosure, for example, the plurality of block regions may be cross-shaped regions each including a plurality of common electrodes (34).

According to this, the shape of the block regions can be flexibly set.

In the touch detection device (24) according to one aspect of the present disclosure, for example, when the detection value of a certain block region is equal to or greater than a touch detection threshold value and is equal to or greater than a threshold value for release determination, the touch detector (76c) may generate a plurality of block regions whose size is smaller than that of the block region and calculate detection values of the plurality of block regions in a region including at least a plurality of common electrodes (34) included in the block region.

According to this, the touch position can be detected with high definition.

The touch detection device (24) according to one aspect of the present disclosure may further include, for example:

a drive circuit (74) that supplies a touch drive signal or a reference voltage for image display to each of the plurality of common electrodes (34); and a control circuit (70) that controls the drive circuit (74) and a touch detection circuit (76) including the touch detector (76c) and alternately repeats partial touch detection on one of a plurality of detection region configured by dividing the plurality of common electrodes (34) within the screen into a plurality of groups, and partial image display on one of a plurality of display regions configured by dividing a plurality of pixels within the screen into a plurality of groups, so as to control the touch detection and the image display in a time division manner, wherein the touch detector (76c) may detect a touch for each detection region.

This allows the report rate to be improved.

The touch detection device (24) according to one aspect of the present disclosure may further include, for example, a drive circuit (74) that supplies a touch drive signal or a reference voltage for image display to each of the plurality of common electrodes (34); and a control circuit (70) that controls the drive circuit (74) and a touch detection circuit (76) including the touch detector (76c) and alternately repeats partial touch detection on one of a plurality of detection region configured by dividing the plurality of common electrodes (34) within the screen into a plurality of groups, and partial image display on one of a plurality of display regions configured by dividing a plurality of pixels within the screen into a plurality of groups, so as to control the touch detection and the image display in a time division manner, wherein the touch detector (76c) may detect a touch for the screen.

This allows the coordinate accuracy to be ensured.

In the touch detection device (24) according to one aspect of the present disclosure, for example, the detection value calculator may output the detection value of each of the plurality of block regions within the display screen in association with the center coordinates of each of the plurality of block regions.

This allows the touch detector (76c) to easily detect a touch position.

In the touch detection device (24) according to one aspect of the present disclosure, for example, the touch detector (76c) may output touch position data on the display screen based on a detected touch position.

This allows the control circuit (70) to identify the touch position in the screen based on the touch position data.

A touch detection method according to one aspect of the present disclosure is a touch detection method of a display device (22) including a plurality of common electrodes (34) arranged in a matrix and used for image display and touch detection, including:

acquiring a plurality of detection values that are based on capacitance of each of the plurality of common electrodes (34);

calculating detection values in a plurality of block regions each containing two or more common electrodes (34) out of the plurality of common electrodes (34) based on the plurality of acquired detection values; and detecting a touch by a conductor on a display screen of the display device (22) based on the calculated detection value of each of the plurality of block regions, wherein the plurality of block regions include at least a first block region and a second block region, the first block region includes at least a first common electrode out of the plurality of common electrodes and a second common electrode adjacent to the first common electrode out of the plurality of common electrodes, the second block region includes at least the second common electrode and a third common electrode adjacent to the second common electrode out of the plurality of common electrodes and different from the first common electrode, and in the calculating, the detection value of each of the plurality of block regions in the display screen is calculated based on the detection value of each of the two or more common electrodes included in each of the plurality of block regions.

This allows the touch detection sensitivity to be improved by flattening the noise and increasing the signal.

A display system (20) according to one aspect of the present disclosure includes:

a display unit (22) including a plurality of common electrodes (34) arranged in a matrix and used for image display and touch detection;

a detection value acquirer (76a) that acquires a plurality of detection values that are based on capacitance of each of the plurality of common electrodes (34);

a detection value calculator (76b) that calculates detection values in a plurality of block regions each containing two or more common electrodes (34) out of the plurality of common electrodes (34) based on the plurality of detection values acquired by the detection value acquirer (76a); and a touch detector (76c) that detects a touch by a conductor on a display screen of the display unit (22) based on the detection value of each of the plurality of block regions calculated by the detection value calculator (76b), wherein the plurality of block regions include at least a first block region and a second block region, the first block region includes at least a first common electrode out of the plurality of common electrodes (34) and a second common electrode adjacent to the first common electrode out of the plurality of common electrodes, the second block region includes at least the second common electrode and a third common electrode adjacent to the second common electrode out of the plurality of common electrodes (34) and different from the first common electrode, and the detection value calculator (76b) calculates the detection value of each of the plurality of block regions in the display screen based on the detection value of each of the two or more common electrodes (34) included in each of the plurality of block regions.

The "touch detector" may be configured by the touch detector 76c alone or a combination of the touch detector 76c and the control circuit 70.

This allows the touch detection sensitivity to be improved by flattening the noise and increasing the signal.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is a Continuation of International Application No. PCT/JP2020/003878, filed on Feb. 3, 2020, which in turn claims the benefit of Japanese Application No. 2019-047425, filed on Mar. 14, 2019, the disclosures of which Applications are incorporated by reference herein.

What is claimed is:

1. A touch detection device of a display device, the display device including a plurality of common electrodes arranged in a matrix and used for image display and touch detection, the touch detection device comprising:
a touch detection circuit which, in operation:
acquires a plurality of first detection values that are based on capacitance of each of the plurality of common electrodes;
calculates second detection values in a plurality of block regions, each of the plurality of block regions containing two or more common electrodes out of the plurality of common electrodes, the second detection values being calculated based on the plurality of first detection values; and
detects a touch by a conductor on a display screen of the display device based on the second detection values, wherein
the plurality of block regions includes at least a first block region and a second block region,
the first block region includes, out of the plurality of common electrodes, at least a first common electrode and a second common electrode, the second common electrode being adjacent to the first common electrode,
the second block region includes, out of the plurality of common electrodes, at least the second common electrode and a third common electrode, the third common electrode being adjacent to the second common electrode and different from the first common electrode,
the touch detection circuit calculates, for each block region of the plurality of block regions in the display screen, a second detection value based on a corresponding first detection value of each of the two or more common electrodes included in the block region,
when the second detection value of the first block region is equal to or greater than a touch detection threshold value and is equal to or greater than a grouping threshold value for determining whether or not to reduce a size of the first block region and specify a position of the touch using smaller block regions, the touch detection circuit:
generates a plurality of second block regions, each of the plurality of second block regions having a size smaller than the first block region; and
calculates third detection values of the plurality of second block regions, the plurality of second block regions including at least the two or more common electrodes included in the first block region,
the touch detection threshold value is for detecting the touch, and
the grouping threshold value is for, after detecting the touch, specifying the position of the touch using the smaller block regions.

2. The touch detection device according to claim 1, wherein
each of the plurality of block regions includes at least one common electrode shared with at least one other block region of the plurality of block regions.

3. The touch detection device according to claim 1, wherein
the touch detection circuit acquires difference values with respect to reference capacitances of the plurality of common electrodes as the first detection values and sums up the respective first detection values of the two or more common electrodes included in each block region of the plurality of block regions so as to calculate the second detection values of the plurality of block regions.

4. The touch detection device according to claim 1, wherein
the touch detection circuit acquires difference values with respect to reference capacitances of the plurality of common electrodes as the first detection values, converts respective first detection values of the two or more common electrodes included in each block region of the plurality of block regions that are equal to zero or below to one, and then multiplies the respective first detection values of each block region after conversion so as to calculate the second detection values of the plurality of block regions.

5. The touch detection device according to claim 1, wherein
the touch detection circuit converts respective first detection values of the two or more common electrodes included in each block region of the plurality of block regions that are negative values to zero and amplifies the respective first detection values of the two or more common electrodes included in each block region of the plurality of block regions that are positive values.

6. The touch detection device according to claim 1, wherein
the plurality of block regions are rectangular regions each including a plurality of common electrodes.

7. The touch detection device according to claim 1, wherein the plurality of block regions are cross-shaped regions each including a plurality of common electrodes.

8. The touch detection device according to claim 1, further comprising:
a drive circuit that supplies a touch drive signal or a reference voltage for image display to each of the plurality of common electrodes; and
a control circuit that controls the drive circuit and the touch detection circuit and alternately repeats partial touch detection on one of a plurality of detection regions configured by dividing the plurality of common electrodes within the display screen into a plurality of first groups, and partial image display on one of a plurality of display regions configured by dividing a plurality of pixels within the display screen into a plurality of second groups, so as to control the touch detection and the image display in a time division manner, wherein
the touch detection circuit detects the touch for each of the plurality of detection regions.

9. The touch detection device according to claim 1, further comprising:
a drive circuit that supplies a touch drive signal or a reference voltage for image display to each of the plurality of common electrodes; and
a control circuit that controls the drive circuit and the touch detection circuit and alternately repeats partial touch detection on one of a plurality of detection regions configured by dividing the plurality of common electrodes within the display screen into a plurality of first groups, and partial image display on one of a plurality of display regions configured by dividing a plurality of pixels within the display screen into a plurality of second groups, so as to control the touch detection and the image display in a time division manner, wherein
the touch detection circuit detects the touch for the display screen.

10. The touch detection device according to claim 1, wherein
the touch detection circuit outputs the second detection values of the plurality of block regions within the display screen in association with center coordinates of each of the plurality of block regions.

11. The touch detection device according to claim 1, wherein
the touch detection circuit outputs touch position data on the display screen based on a detected touch position.

12. A touch detection method of a display device, the display device including a plurality of common electrodes arranged in a matrix and used for image display and touch detection, the touch detection method comprising:
acquiring a plurality of first detection values that are based on capacitance of each of the plurality of common electrodes;
calculating second detection values in a plurality of block regions, each of the plurality of block regions containing two or more common electrodes out of the plurality of common electrodes, the second detection values being calculated based on the plurality of first detection values; and
detecting a touch by a conductor on a display screen of the display device based on the second detection values, wherein
the plurality of block regions includes at least a first block region and a second block region,
the first block region includes, out of the plurality of common electrodes, at least a first common electrode and a second common electrode adjacent to the first common,
the second block region includes, out of the plurality of common electrodes, at least the second common electrode and a third common electrode, the third common electrode being adjacent to the second common electrode and different from the first common electrode,
in the calculating, for each block region of the plurality of block regions in the display screen, a second detection value is calculated based on a corresponding first detection value of each of the two or more common electrodes included in the block region,
when the second detection value of the first block region is equal to or greater than a touch detection threshold value and is equal to or greater than a grouping threshold value for determining whether or not to reduce a size of the first block region and specify a position of the touch using smaller block regions, the touch detection method further comprises:
generating a plurality of second block regions, each of the plurality of second block regions having a size smaller than the first block region; and
calculating third detection values of the plurality of second block regions, the plurality of second block regions including at least the two or more common electrodes included in the first block region,
the touch detection threshold value is for detecting the touch, and
the grouping threshold value is for, after detecting the touch, specifying the position of the touch using the smaller block regions.

13. A touch detection device of a display device, the display device including a plurality of common electrodes arranged in a matrix and used for image display and touch detection, the touch detection device comprising:
a touch detection circuit which, in operation;
acquires a plurality of first detection values that are based on capacitance of each of the plurality of common electrodes;
calculates second detection values in a plurality of block regions, each of the plurality of block regions containing two or more common electrodes out of the plurality of common electrodes, the second detection values being calculated based on the plurality of first detection values; and
detects a touch by a conductor on a display screen of the display device based on the second detection values, wherein
the plurality of block regions includes at least a first block region and a second block region,
the first block region includes, out of the plurality of common electrodes, at least a first common electrode and a second common electrode, the second common electrode being adjacent to the first common electrode,
the second block region includes, out of the plurality of common electrodes, at least the second common electrode and a third common electrode, the third common electrode being adjacent to the second common electrode and different from the first common electrode,
the touch detection circuit calculates, for each block region of the plurality of block regions in the display screen, a second detection value based on a corresponding first detection value of each of the two or more common electrodes included in the block region, and the touch detection circuit acquires difference values with respect to reference capacitances of the plurality of common electrodes as the first detection values, converts respective first detection values of the two or more common electrodes included in each block region of the plurality of block regions that are equal to zero or below to one, and then multiplies the respective first detection values of each block region after conversion so as to calculate the second detection values of the plurality of block regions.

* * * * *